US010965972B2

(12) United States Patent
Choi et al.

(10) Patent No.: US 10,965,972 B2
(45) Date of Patent: Mar. 30, 2021

(54) METHOD FOR CONTENTS PLAYBACK WITH CONTINUITY AND ELECTRONIC DEVICE THEREFOR

(71) Applicant: Samsung Electronics Co., Ltd., Suwon-si (KR)

(72) Inventors: Pilsik Choi, Suwon-si (KR); Junghwan Ku, Suwon-si (KR); Hyun Kim, Suwon-si (KR); Jaeyong Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/527,630

(22) Filed: Jul. 31, 2019

(65) Prior Publication Data

US 2020/0053399 A1 Feb. 13, 2020

(30) Foreign Application Priority Data

Aug. 8, 2018 (KR) .................. 10-2018-0092703

(51) Int. Cl.
*H04N 21/41* (2011.01)
*H04N 21/2387* (2011.01)
(Continued)

(52) U.S. Cl.
CPC ..... *H04N 21/2387* (2013.01); *H04N 21/4108* (2013.01); *H04N 21/436* (2013.01); *H04N 21/47217* (2013.01)

(58) Field of Classification Search
CPC .......... H04N 21/2387; H04N 21/4108; H04N 21/436; H04N 21/47217; H04N 21/43615; G06F 3/04886
See application file for complete search history.

(56) References Cited

U.S. PATENT DOCUMENTS 9,009,266 B2 4/2015 Cho et al.
9,288,072 B2 3/2016 Moon et al.
(Continued)

FOREIGN PATENT DOCUMENTS

KR 10-2012-0134598 A 12/2012
KR 10-2014-0004730 A 1/2014
KR 10-2015-0058720 A 5/2015

OTHER PUBLICATIONS

International Search Report dated Dec. 2, 2019, issued in International Application No. PCT/KR2019/009519.

*Primary Examiner* — Kim T Nguyen
(74) *Attorney, Agent, or Firm* — Jefferson IP Law, LLP

(57) ABSTRACT

An electronic device is provided. The electronic device includes a display, at least one communication circuit, a processor operatively connected to the display and the at least one communication circuit, and a memory operatively connected to the processor. The electronic device may receive user activity information including information of content, which is currently being played or has been previously played in the electronic device, from a content provider (CP) server through an internet of things (IoT) server when one or more external electronic devices are discovered and may display a first UI for recommending playing the content, which is being currently played or has been previously played in the electronic device, through at least one of the one or more external electronic devices on the display, based on the discovered one or more external electronic devices and the list of the external electronic device.

15 Claims, 16 Drawing Sheets

(51) Int. Cl.
*H04N 21/436* (2011.01)
*H04N 21/472* (2011.01)

(56) References Cited

U.S. PATENT DOCUMENTS

| | | |
|---|---|---|
| 9,685,190 B1 | 6/2017 | Fishkin et al. |
| 9,954,948 B2 | 4/2018 | McKnight et al. |
| 10,057,632 B2 | 8/2018 | Seo |
| 2007/0136488 A1 | 6/2007 | Cho et al. |
| 2012/0185574 A1 | 7/2012 | Cho et al. |
| 2012/0311100 A1 | 12/2012 | Kim et al. |
| 2013/0347044 A1 | 12/2013 | Lee et al. |
| 2014/0164558 A1 | 6/2014 | Moon et al. |
| 2014/0362293 A1* | 12/2014 | Bakar ............... H04N 21/858 348/552 |
| 2015/0215360 A1 | 7/2015 | Cho et al. |
| 2016/0013980 A1 | 1/2016 | McKnight et al. |
| 2016/0077710 A1 | 3/2016 | Lewis et al. |
| 2016/0366468 A1 | 12/2016 | Seo |
| 2017/0351409 A1 | 12/2017 | Lewis et al. |
| 2018/0014075 A1 | 1/2018 | Lewis et al. |
| 2018/0337880 A1* | 11/2018 | Sokolov ............ H04N 21/6581 |

\* cited by examiner

METHOD FOR CONTENTS PLAYBACK WITH CONTINUITY AND ELECTRONIC DEVICE THEREFOR

CROSS-REFERENCE TO RELATED APPLICATION(S)

This application is based on and claims priority under 35 U.S.C. § 119(a) of a Korean patent application number 10-2018-0092703, filed on Aug. 8, 2018, in the Korean Intellectual Property Office, the disclosure of which is incorporated by reference herein in its entirety.

BACKGROUND

1. Field

The disclosure relates to a method for contents playback with continuity and an electronic device therefor.

2. Description of Related Art

As electronic devices with an Internet link function are widely distributed, an Internet of things (IoT) environment is being built. In the IoT environment, electronic devices connected via Internet may collect, share, and analyze data to provide more intelligent services. For example, the electronic device may provide the service provided by the electronic device, via another electronic device of a user by using data associated with a user.

When a television (TV) or a multimedia device (e.g., set-top box) connected to the TV has an Internet connection, the contents (e.g., movies, music, and/or multimedia) from a contents provider (CP) may be played on a TV via Internet. For example, the user of the mobile device may desire to play the contents provided by the CP on the mobile device and the TV. The user may desire to watch the contents, which the user is watching on the mobile device, via another electronic device (e.g., TV).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a contents providing method having content continuity.

A user may attempt to seamlessly play contents between multiple devices. For example, the user may desire to play the contents being played on the mobile device, via a television (TV). In this case, the user may turn on the TV and then may install the application of a content provider (CP) on the TV by using the application providing service provided on the TV. Furthermore, the user may log in to the service of the CP by using the application of the CP installed in the TV and may perform remote playback of the content by selecting the corresponding TV by using a mobile device.

In this case, because the procedure for seamless playback is complicated and a lot of portions of the procedure are also performed on the TV, the user may have difficulty in seamless contents playback. For example, because the TV is generally controlled by a remote controller and does not have a separate keyboard, it is difficult for the user to install an application using a TV and to log in the application.

Additional aspects will be set forth in part in the description which follows and, in part, will be apparent from the description, or may be learned by practice of the presented embodiments.

In accordance with an aspect of the disclosure, an electronic device is provided. The electronic device includes a display, at least one communication circuit, a processor operatively connected to the display and the at least one communication circuit, and a memory operatively connected to the processor. The memory may store instructions that, when executed, cause the processor to when one or more first external electronic devices are discovered, through an Internet of things (IoT) server, the user activity information including contents information of contents which is currently played or was previously played in the electronic device obtain a list including one or more second external electronic devices supporting contents playback of a CP associated with the CP server from the IoT server based on the user activity information, and display a first user interface (UI) on the display for recommending playing the contents from the one or more first external electronic devices or the one or more second external electronic devices.

In accordance with another aspect of the disclosure, an electronic device is provided. The electronic device includes at least one communication circuit, a processor operatively connected to the at least one communication circuit, and a memory operatively connected to the processor and storing CP metadata. The memory stores instructions that, when executed, cause the processor to determine whether an input to the first UI is received to request playback of the contents using at least one of the one or more first external electronic devices, when a user activity information request is received from a first external electronic device, identify a CP that is associated with the user activity information request and obtain user activity information associated with the first external electronic device from a CP server of the CP, and display a second UI on the display comprising a second list including the one or more third external electronic devices.

In accordance with another aspect of the disclosure, a contents playing method of an electronic device is provided. The method includes when one or more external electronic devices are discovered, receiving user activity information from a contents provider (CP) server through an Internet of things (IoT) server, the user activity information including contents information of contents which is currently played or was previously played in the electronic device, obtaining a list including one or more second external electronic devices supporting contents playback of a CP associated with the CP server from the IoT server based on the user activity information, and displaying a first UI on a display for recommending playing the contents from the one or more first external electronic devices or the one or more second external electronic devices.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more such surfaces.

Below, various embodiments of the disclosure may be described with reference to accompanying drawings. The embodiments and terms used with regard to the embodiments are not intended to limit the technology described herein to specific embodiments, and should be understood to include various modifications, equivalents, and/or alternatives of the embodiments.

Figure 1:
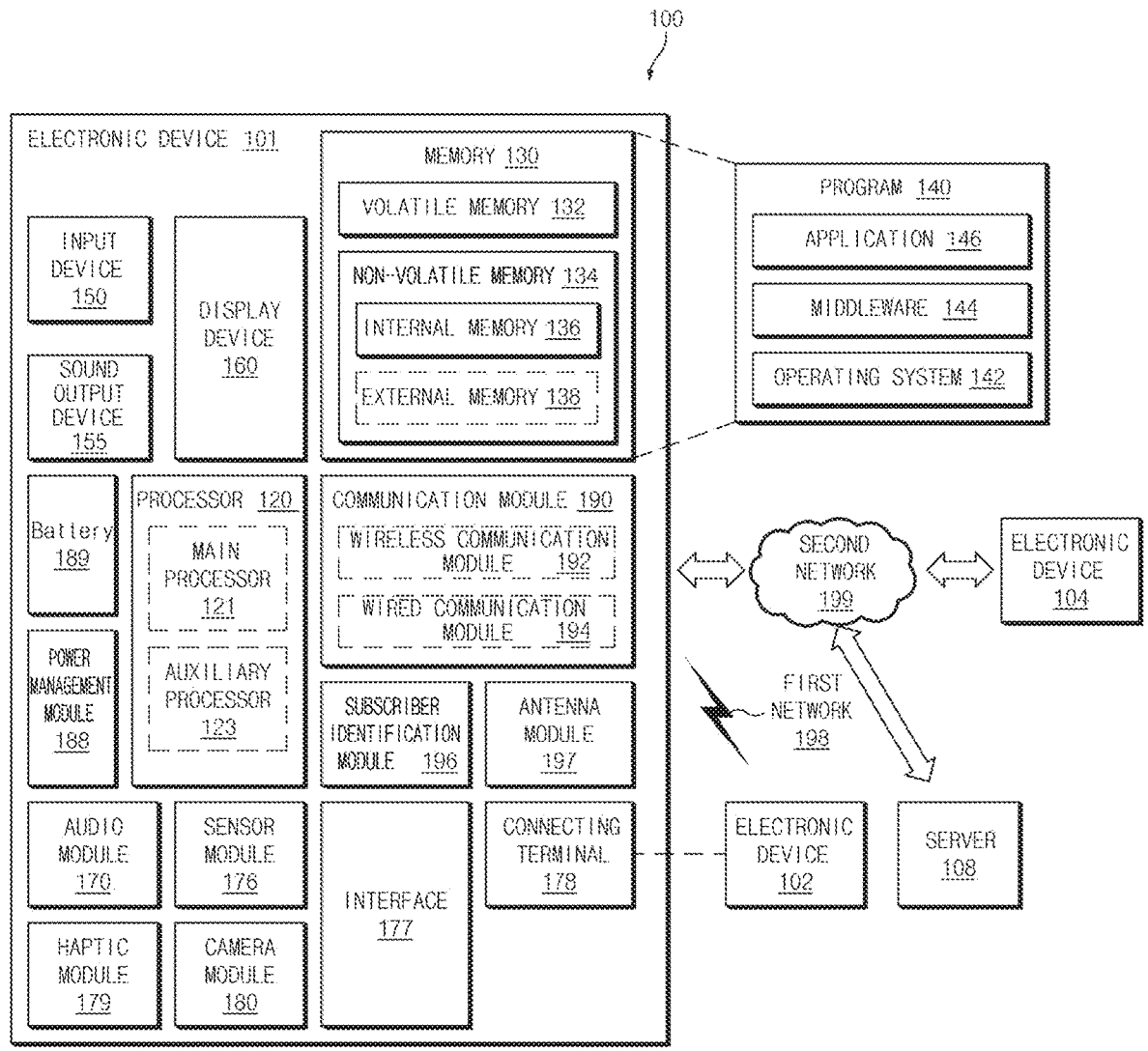
FIG. 1 illustrates a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

In various embodiments to be described below, the operations of the electronic device 101 may be performed by the processor 120. For example, the processor 120 may control the operations of the electronic device 101 based on instructions stored in the memory 130.

Figure 2:
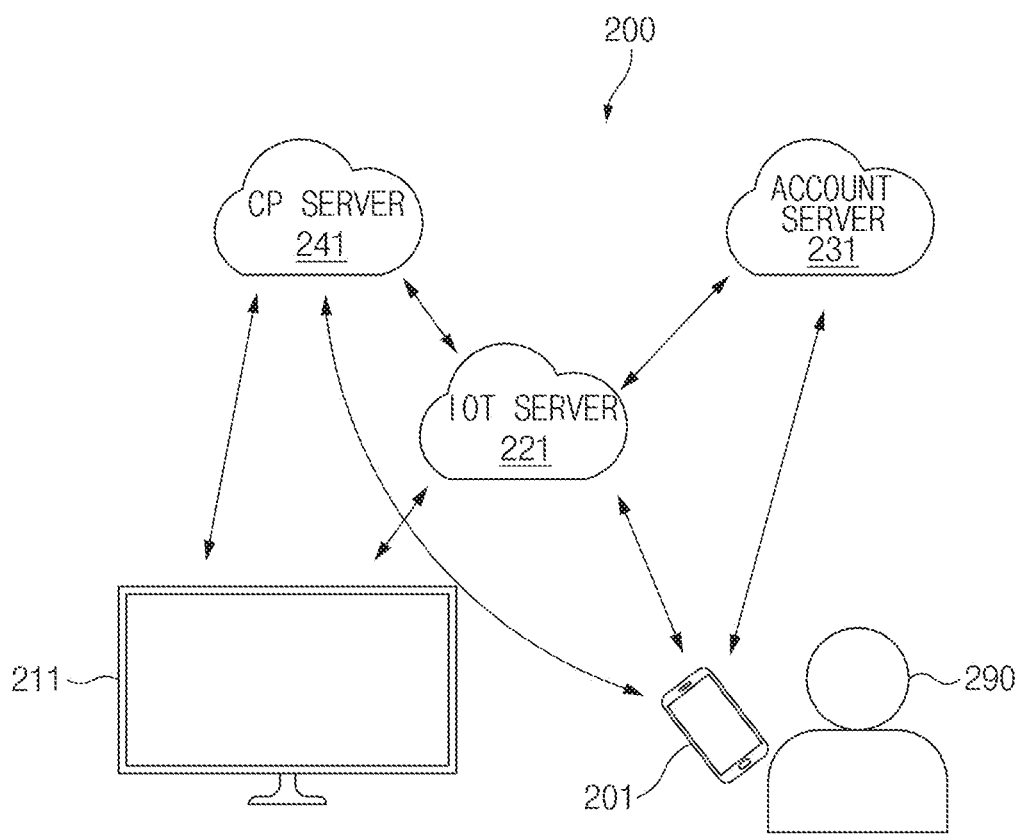
FIG. 2 illustrates a contents playback environment according to an embodiment of the disclosure.

FIG. 2 illustrates a contents playback environment according to an embodiment of the disclosure.

Referring to FIG. 2, a user 290 of a first electronic device 201 may watch the contents provided by a CP in the contents playback environment. For example, the first electronic device 201 may provide contents to the user 290 by receiving contents stream from a CP server 241. According to an embodiment, the user 290 may log in to the CP server 241, using the first electronic device 201. For example, the user 290 may log in to the CP server 241, using a CP application installed in the first electronic device 201. In another example, the user 290 may log in to the CP server 241 using the information stored in an account server 231 based on the account linking between the CP server 241 and an internet of things (IoT) server 221. An embodiment is exemplified in FIG. 2 as the first electronic device 201 is a mobile device. However, the first electronic device 201 is not limited thereto. The first electronic device 201 may be a user device having a multimedia playback function. For example, the first electronic device 201 may be an electronic device having a configuration similar to that of the electronic device 101 of FIG. 1.

According to various embodiments, the user 290 may watch contents from a CP, using a second electronic device 211. For example, the second electronic device 211 may provide contents to the user 290 by receiving contents stream from the CP server 241. For example, the user 290 may log in to the CP server 241, using the CP application provided to the second electronic device 211 or the account linking. An embodiment is exemplified in FIG. 2 as the second electronic device 211 is a television (TV). However, the second electronic device 211 is not limited thereto. The second electronic device 211 may be a user device having a multimedia playback function. For example, the second electronic device 211 may be an electronic device having a configuration similar to that of the electronic device 101 of FIG. 1.

According to various embodiments, contents playback with continuity (e.g., seamless contents playback) may be supported between the first electronic device 201 and the second electronic device 211. For example, the contents playback with continuity may mean that the contents played by the first electronic device 201 are continuously played by the second electronic device 211. In the contents playback with continuity, when the user 290 plays the corresponding contents in the second electronic device 211 after the user 290 plays contents in the first electronic device 201 to the first time point, the second electronic device 211 may play the corresponding contents from the second time point corresponding to the first time point. For example, the second time point may be the same as or similar to the first time point.

According to an embodiment, the CP associated with the CP server 241 may be the CP supporting contents playback with continuity (e.g., seamless contents playback) and may be registered in the IoT server 221. According to an embodiment, while the user 290 plays the contents provided from the CP server 241 in the first electronic device 201, when the second electronic device 211 supporting the contents playback with continuity is discovered or when a user input to the contents playback with continuity is received, the first electronic device 201 may recommend the contents playback with continuity to the user 290. For example, when the discovered at least one external electronic device (e.g., the second electronic device 211) supporting the contents playback with continuity supports the CP associated with the CP server 241, the first electronic device 201 may recommend the contents playback with continuity. For example, the first electronic device 201 may discover at least one external electronic device (e.g., the second electronic device 211), using near field communication (NFC), device-to-device (D2D) communication, Wi-Fi, electromagnetic (EM) sensing, Bluetooth, Bluetooth low energy (BLE), a neighbor awareness network (NAN), sound recognition, ultrasound communication, and/or user voice detection. For example, the first electronic device 201 may recommend the contents playback with continuity through the content continuity platform supported by the IoT server 221. For example, the first electronic device 201 may display the discovered at least one external electronic device as the recommendation for the contents playback with continuity on a display. According to an embodiment, the first electronic device 201 may perform contents playback with continuity through the second electronic device 211, based on a user input to the recommendation of the contents playback with continuity. For example, when a user input to select the second electronic device 211 among a plurality of external electronic devices (e.g., discovered external electronic devices) is received, the first electronic device 201 may perform the contents playback with continuity through the second electronic device 211. After the first electronic device 201 turns on the second electronic device 211 and then, after booting is completed, the first electronic device 201 may allow the second electronic device 211 to log in to the CP server 241 with the user account of the first electronic device 201 and control the second electronic device 211 to play the contents with continuity. For example, when the second electronic device 211 does not include the CP application associated with the CP server 241, the IoT server 221 may control the second electronic device 211 such that the second electronic device 211 installs a CP device application. Hereinafter, the method, procedure, platform, and/or services for the contents playback with continuity may be referred to as the content continuity. For example, hereinafter, the contents playback with continuity may be referred to as the content continuity playback.

According to an embodiment, the first electronic device 201 and/or the second electronic device 211 may be referred to as an IoT device. For example, the IoT device may refer to a device having an IoT function. The IoT device may be connected to the IoT server 221 over an arbitrary communication network such as Internet.

According to an embodiment, the second electronic device 211 may include an IoT agent. The IoT agent may refer to a software module of the IoT device communicating with the IoT server 221. For example, the IoT agent may be referred to as an IoT application. The IoT agent may identify the CP device application with respect to the contents playback state inquiry request and the contents playback request transmitted from the IoT server 221 and may communicate with the IoT server 221.

According to an embodiment, the first electronic device 201 and/or the second electronic device 211 may be a device supporting content continuity. The electronic device supporting the content continuity may be referred to as the continuity device. The IoT agent (e.g., the IoT application) of an electronic device (e.g., an IoT device) supporting the content continuity may have a continuity resource. The IoT agent may notify another electronic device whether the content continuity is supported, using the continuity resource. For example, the continuity resource may include information indicating the support of the content continuity and/or associated CP information. According to an embodiment, the IoT agent may communicate with the software module for media playback in the IoT device. For example, the IoT agent may request the software module for media playback to play contents or may query the current playback state.

According to an embodiment, the IoT server 221 may store information of the CP supporting the content continuity. For example, the IoT server 221 may provide the first electronic device 201 and/or the second electronic device 211 with the information of the CP supporting the content continuity. According to an embodiment, the IoT server 221 may store the information of at least one CP linked to the account (e.g., an IoT account) of the user 290. According to an embodiment, the IoT server 221 may query the state (e.g., login and/or playback state) of the user 290 and/or the playlist associated with the user 290, from the CP server 241. According to an embodiment, the IoT server 221 may search for a continuity device (e.g., the first electronic device 201 and/or the second electronic device 211) associated with the account of the user 290 and may request the contents playback with continuity, to the continuity device associated with the account of the user 290.

According to an embodiment, the first electronic device 201 may include an IoT mobile application. For example, the IoT mobile application (e.g., the IoT application) may monitor and control the IoT device (e.g., the second electronic device 211) connected to the IoT server 221, through the account (e.g., the IoT account) of the user 290. The IoT mobile application may obtain information of the CP supporting the content continuity and/or information of the CP associated with (e.g., linked to) the account of the user 290, from the IoT server 221. The IoT mobile application may obtain the state of the user 290 associated with the CP server 241 and/or the playlist associated with the account of the user 290 from the CP server 241 through the IoT server 221. The IoT mobile application may search for the continuity device associated with the account of the user 290 and may request content continuity playback from the continuity device (e.g., the second electronic device 211). The IoT mobile application may participate in a media router framework by publishing the media such that the CP device application of the second electronic device 211 is connected to media to play the media.

For example, the media router framework may be an interface provided by the OS of the first electronic device 201 and/or the second electronic device 211. According to an embodiment, the CP application using the media router framework may support the search of an external electronic device, the link of an external electronic device, and/or the media playback via an external electronic device, using abstracted interfaces independent of the type, manufacturer, and/or protocol of a device. For example, the manufacturer of the electronic device participating in the media router framework may register a media router for the manufacturer in the OS of the first electronic device 201 such that an electronic device (e.g., the second electronic device 211) operates through the media router framework. According to an embodiment, the media router framework may support the media remote playback of a remote receiver device (e.g., the second electronic device 211) in the OS of the first electronic device 201. For example, the CP application included in the first electronic device 201 may play the media in the continuity device (e.g., the second electronic device 211) participating in the media router framework through the media router framework.

According to an embodiment, the account server 231 may manage the account of the user 290 associated with the IoT mobile application. For example, the account server 231 may manage and/or store the account information (e.g., account identification information) associated with the IoT application and link information of the CP account associated with the account. For example, the account server 231 may manage and/or store the IoT account information (e.g., an account identifier) of the IoT server 221 of the user 290, the CP account information (e.g., an account identifier) of the CP server 241 of the user 290, and link information between IoT account information and CP account information. According to an embodiment, the user 290 may interlock the CP account to the IoT account of the user 290, using an IoT application or a mobile IoT application.

According to an embodiment, the CP mobile application (e.g., CP application) may make a request for the contents playback with continuity to the continuity device (e.g., the second electronic device 211), using the media router framework. For example, the CP mobile application may be an application provided by the CP installed in the first electronic device 201. The CP mobile application may control the login to the CP server 241 and the reception of contents from the CP server 241.

According to an embodiment, the second electronic device 211 may include a CP device application (e.g., a CP application). For example, the CP device application may be a playback-related software module of the CP included in the continuity device. For example, the CP device application may receive the login and a playback request from the IoT agent and then may play the contents requested, based on the playback request, in the second electronic device 211 after logging in to the CP server 241 based on login information. For example, the CP device application may receive a state inquiry from the IoT agent and may respond to the IoT agent with the login state of the user 290 and/or the information associated with the playback state.

According to an embodiment, the IoT agent included in the second electronic device 211 may receive the login state and/or the playback state inquiry request from the IoT server 221 and may notify the IoT server 221 that the CP device application is not installed, when the CP device application is not installed in the second electronic device 211. After the IoT server 221 determines whether the CP device application is capable of being installed in the second electronic device 211, when the installation is possible, the IoT server 221 may transmit a CP device application installation request to the IoT agent of the second electronic device 211. After the IoT agent of the second electronic device 211 downloads and installs the CP device application, the IoT agent may transmit a signal indicating that the installation is completed to the IoT server 221. For example, the IoT agent of the second electronic device 211 may access the CP server 241 and may download the CP device application.

Figure 3:
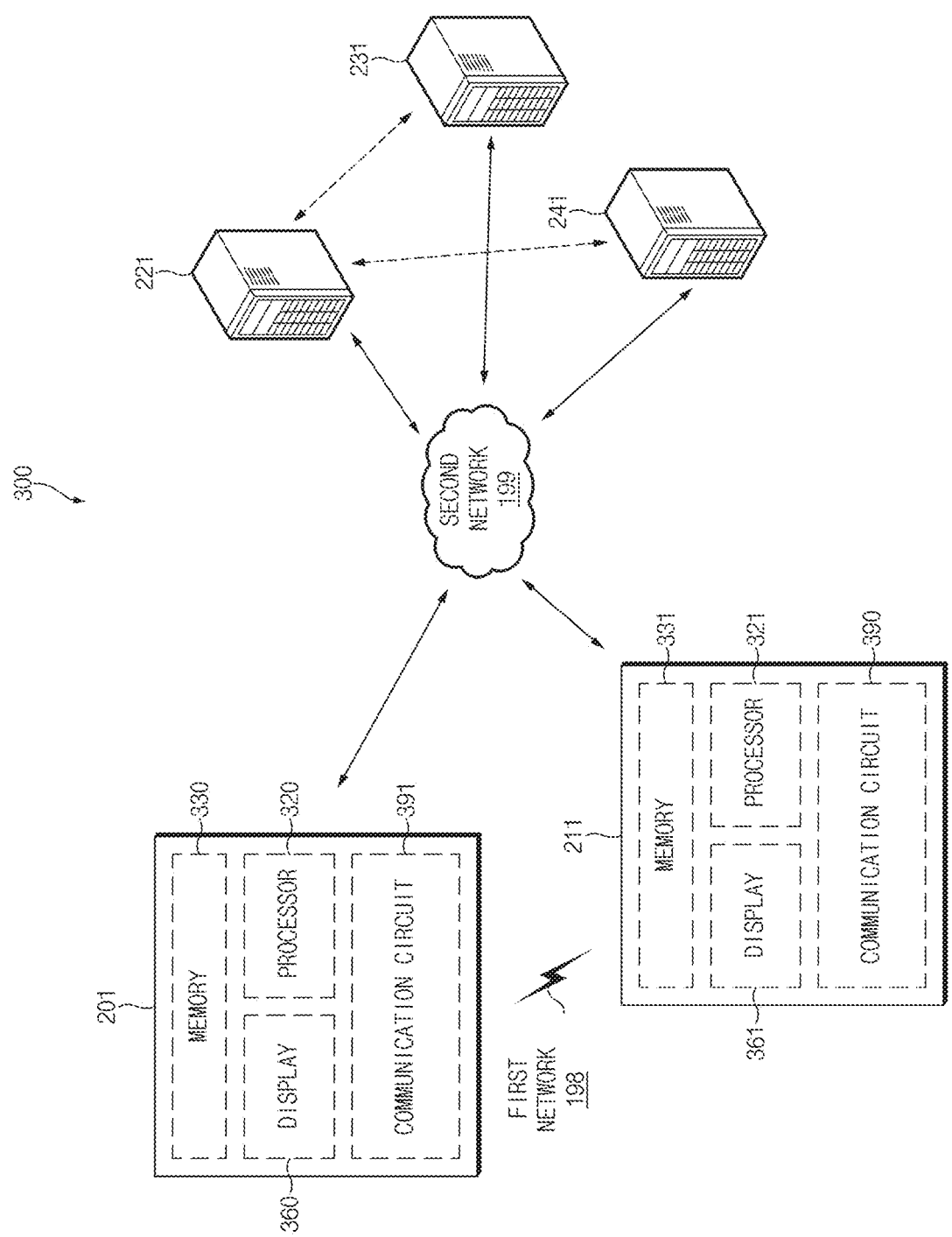
FIG. 3 illustrates a block diagram of an electronic device in a network environment according to an embodiment of the disclosure.

FIG. 3 illustrates a block diagram of an electronic device in the network environment according to an embodiment of the disclosure.

Referring to FIG. 3, a network environment 300 is illustrated. According to various embodiments, the first electronic device 201 may include a processor 320 (e.g., the processor 120 of FIG. 1), a memory 330 (e.g., the memory 130 of FIG. 1), a display 360 (e.g., the display device 160 of FIG. 1), and a communication circuit 390 (e.g., the communication module 190 of FIG. 1). For example, the processor 320 may be operatively connected to the memory 330, the display 360, and the communication circuit 390. The operations of the first electronic device 201 may be performed by the processor 320. For example, the memory 330 may store instructions that allow the processor 320 to perform specified operations.

According to various embodiments, the second electronic device 211 may include a processor 321 (e.g., the processor 120 of FIG. 1), a memory 331 (e.g., the memory 130 of FIG. 1), a display 361 (e.g., the display device 160 of FIG. 1), and a communication circuit 391 (e.g., the communication module 190 of FIG. 1). For example, the processor 321 may be operatively connected to the memory 331, the display 361, and the communication circuit 391. The operations of the second electronic device 211 may be performed by the processor 321. For example, the memory 331 may store instructions that allow the processor 321 to perform specified operations.

An embodiment is exemplified in FIG. 3, the IoT server 221, the account server 231, and the CP server 241 are each illustrated as a single server. However, various embodiments of the disclosure are not limited thereto. For example, at least one of the IoT server 221, the account server 231, or the CP server 241 may be composed of a plurality of servers. In another example, the IoT server 221, the account server 231, and/or the CP server 241 may be integrated with a single server.

According to various embodiments, the first electronic device 201 may communicate with the IoT server 221, the account server 231, and the CP server 241 over a second network (e.g., the second network 199 of FIG. 1). The first electronic device 201 may communicate with the second electronic device 211 over the second network 199 and/or a first network (e.g., the first network 198 of FIG. 1).

CP Information of the IoT Server 221

According to various embodiments, the IoT server 221 may store and/or manage information associated with the CP. For example, the IoT server 221 may store CP metadata and application metadata (e.g., an authentication method, application information, and/or information associated with a continuity link method). The IoT server 221 may store and/or manage information associated with at least one CP.

According to an embodiment, the CP metadata may include information about content continuity supported by the CP. For example, the CP metadata may include account linking information between an IoT account and a CP account and/or CP identification information. For example, the CP metadata may include a CP identifier, a CP name, CP registration version information, CP type information (e.g., a partner or a developer), CP support contents information (e.g., generic, movie, TV show, music, and/or radio), continuity link information (e.g., continuity using the link between applications or continuity using the link between cloud services), a CP company name, CP uniform resource locator (URL), CP icon information (e.g., an icon location (URL) and/or an icon display size), CP support nation information, CP description information, and/or IoT account linking information (e.g., the account linking information between an IoT account and a CP account).

According to an embodiment, the application metadata may include device information supporting the continuity of the CP, application information supporting the continuity of the CP, and/or authentication method information. For example, the application metadata may include an application identifier, an application name, an application address (e.g., an uniform resource indicator (URI)) on a device, an authentication information, information about a device type capable of executing an application, developer information of an application, execution OS information of an application, and/or information about the name of a device model capable of executing an application. For example, the authentication information may include information associated with encryption to be applied to the authentication of an application. For example, the authentication information may include information about the login to the CP server 241 through IoT account linking and/or encryption information used for authentication.

CP Device Application Installation of the Second Electronic Device 211

According to various embodiments, the second electronic device 211 may be registered in the IoT server 221. For example, the user of the first electronic device 201 may register the second electronic device 211 in the IoT server 221, using the IoT mobile application of the first electronic device 201. In another example, the user may register may register the second electronic device 211 in the IoT server 221, using the IoT application of the second electronic device 211. The user may register the second electronic device 211 in the IoT server 221, by logging in to the IoT server 221 based on the account (e.g., the IoT account associated with the first electronic device 201) of the user by using an IoT application of the second electronic device 211.

According to an embodiment, when the second electronic device 211 supports content continuity, information indicating that the second electronic device 211 supports the content continuity may be stored in the IoT server 221. For example, the second electronic device 211 may be registered in the IoT account associated with the first electronic device 201.

According to an embodiment, after the registration of the second electronic device 211, the IoT agent of the second electronic device 211 may install the CP device application in the second electronic device 211. For example, the IoT agent may receive CP information (e.g., a CP device application address) of the CP associated with the user account of the second electronic device 211, from the IoT server 221. The IoT agent may determine whether the corresponding CP device application is capable of being installed in the second electronic device 211, using the CP information and may install the CP device application in the second electronic device 211, using the CP information when the installation is possible. For example, after the installation of the CP device application, the second electronic device 211 may transmit information indicating that the installation is completed, to the IoT server 221.

Discovery of the Second Electronic Device 211

According to various embodiments, the first electronic device 201 may discover the second electronic device 211. For example, while moving during the playback of media, the user of the first electronic device 201 may approach the second electronic device 211 using the CP mobile application of the first electronic device 201. For example, the IoT mobile application of the first electronic device 201 may discover the second electronic device 211 by receiving a device list (e.g., a device list supporting content continuity) from the IoT server 221. In another example, the first electronic device 201 may discover the second electronic device 211 by searching for an external electronic device based on a user input associated with the content continuity. In another example, the first electronic device 201 may discover the second electronic device 211 based at least on the found external electronic device and the device list received from the IoT server 221.

According to an embodiment, the first electronic device 201 may discover the second electronic device 211 based on proximity recognition. For example, the first electronic device 201 may discover the second electronic device 211, using NFC, D2D communication, Wi-Fi, EM sensing, Bluetooth, BLE, NAN, sound recognition, ultrasound communication, and/or user sound recognition.

According to an embodiment, the first electronic device 201 may determine whether the second electronic device 211 discovered using the CP mobile application is capable of playing the media being played in the first electronic device 201, using the CP device application. For example, the first electronic device 201 may determine whether the second electronic device 211 supports the CP device application by receiving the device list supporting the CP device application from the IoT server 221. For example, only when the second electronic device 211 supports the CP device application, the first electronic device 201 may distinguish the second electronic device 211 as the discovered device.

4. Recommendation of Content Continuity

According to various embodiments, when a device supporting the content continuity is close (e.g., discovered), the IoT mobile application of the first electronic device 201 may recommend content continuity playback. For example, the first electronic device 201 may determine whether the discovered device (e.g., the second electronic device 211) is a continuity device, using information stored in the IoT server 221. According to an embodiment, when a specified condition is satisfied, the first electronic device 201 may provide a user with the list of electronic devices supporting the content continuity. For example, when media from the CP is being currently played in the first electronic device 201 or when the first electronic device 201 plays the media from the CP within a specified time, the first electronic device 201 may provide the user with the list of electronic devices supporting the content continuity.

According to various embodiments, the first electronic device 201 may recommend the content continuity based on the continuity link information (e.g., continuity using the link between applications or continuity using the link between clouds) of the corresponding CP in the different methods.

4-1. Content Continuity Using Link Between Applications

When the continuity link information of the CP for the recommendation of content continuity indicates the link between applications, the IoT mobile application of the first electronic device 201 may support the content continuity, using the communication with the CP mobile application in the first electronic device 201.

Figure 4:
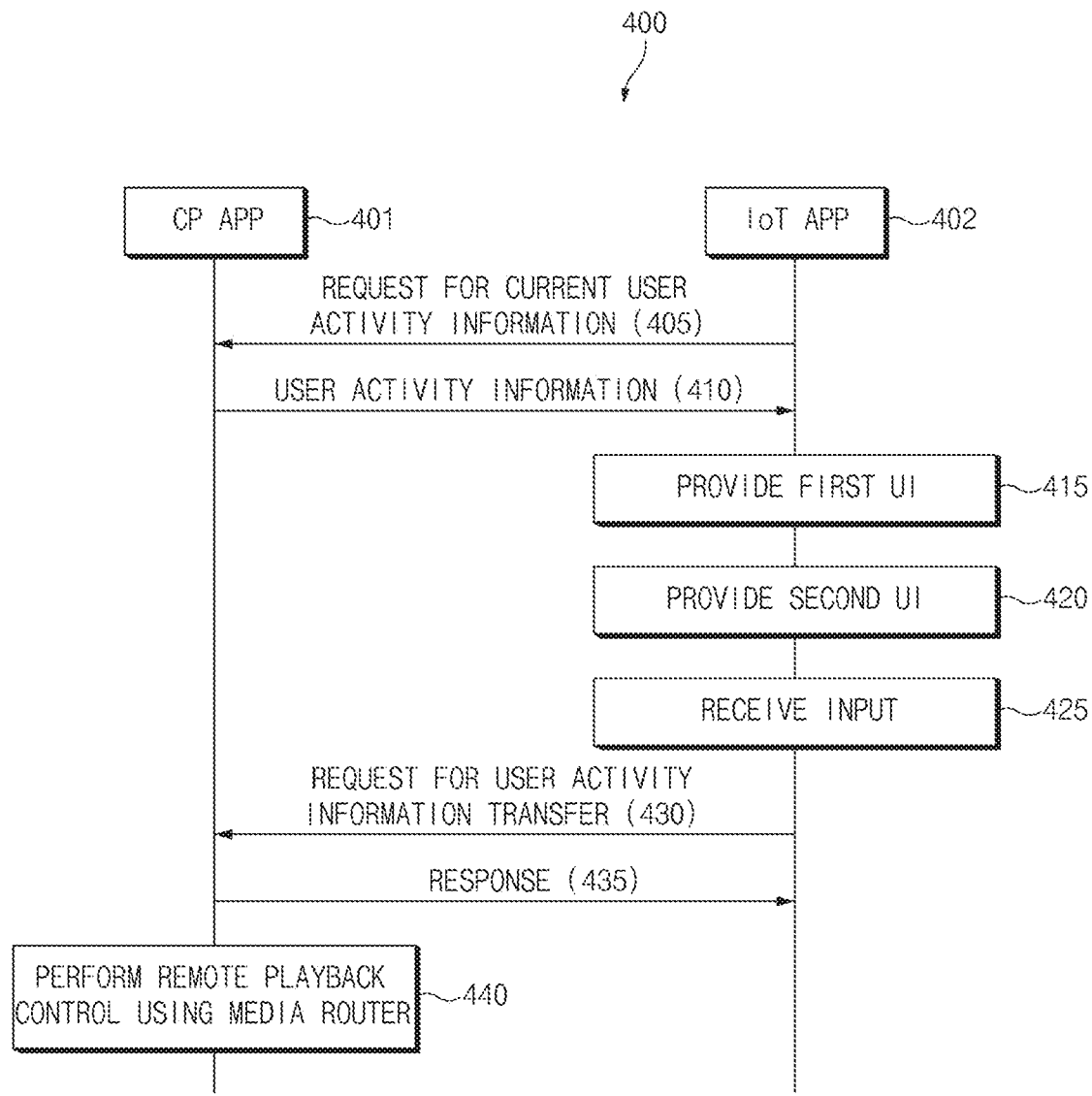
FIG. 4 illustrates a signal flowchart between applications according to an embodiment of the disclosure.

FIG. 4 illustrates a signal flowchart between applications according to an embodiment of the disclosure.

Referring to FIG. 4, a signal flowchart 400 is illustrated. An IoT application (APP) 402 may be referred to as the IoT mobile application of the first electronic device 201, and a CP APP 401 may be referred to as the CP mobile application of the first electronic device 201.

Referring to FIG. 4, according to various embodiments, in operation 405, the IoT APP 402 may request current user activity information from the CP APP 401. For example, the IoT APP 402 may transmit a request for the user activity information to the CP APP 401.

According to various embodiments, in operation 410, the CP APP 401 may transmit the user activity information to the IoT APP 402. According to an embodiment, the user activity information may include information of contents, which is associated with the CP server 241, and which is being currently played in the first electronic device 201 or was played previously in the first electronic device 201. For example, the user activity information may include information of contents employed by the user of the first electronic device 201 and playback information of contents, from the CP server 241. For example, the user activity information may include whether contents being played currently are present, recently played contents information (e.g., timestamp information of recently played contents), linked account information (e.g., CP account information associated with the IoT account of the user of the first electronic device 201), item information, progress information (e.g., the current or last playback progress position of contents), offset information, and/or the number of available items.

For example, the item information may include the contents identifier (e.g., the contents identifier defined by the CP and/or an external database), contents description information, and/or contents-related information (e.g., contents-related image). For example, the contents description information may include a type of contents (e.g., generic, movie, TV show, music, and/or radio), a release date, a broadcasting date, a title, a subtitle, an artist, an album artist, an album title, contents-related image information (e.g., display size and image address information), a composer, a disk number, a track number, a season number, an episode number, a series title, a studio, and/or language.

According to various embodiments, the IoT APP 402 may determine whether to recommend the content continuity based on the user activity information. According to various embodiments, when it is determined that the content continuity is recommended, in operation 415, the IoT APP 402 may provide a first user interface (UI). For example, when the contents currently played is present in the user activity information or when contents played within a specified time based on the timestamp information is present, the IoT APP 402 may provide the first UI.

Figure 5:
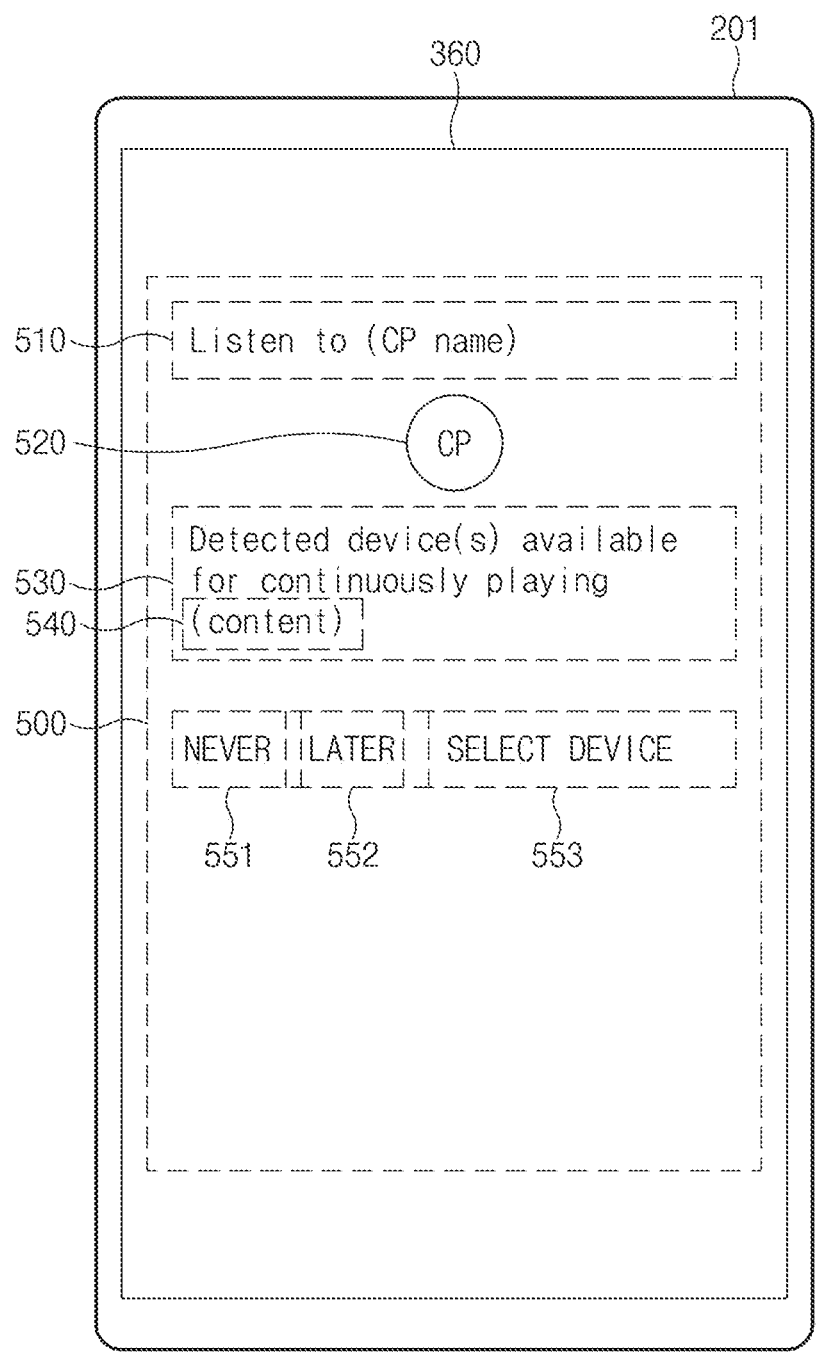
FIG. 5 illustrates a first user interface according to an embodiment of the disclosure.

FIG. 5 illustrates a first user interface according to an embodiment of the disclosure.

Referring to FIG. 5, according to various embodiments, the first electronic device 201 may display a first UI 500 in the partial region of the display 360. According to an embodiment, the first UI 500 may include CP information 510 for recommending the content continuity. For example, the CP information 510 may include the name of the CP. According to an embodiment, the first UI 500 may include a CP image 520. For example, the CP image 520 may be an icon corresponding to the CP. According to an embodiment, the first UI 500 may include a guide 530 indicating that a device supporting the content continuity has been discovered. For example, the guide 530 may include a name 540 of contents for performing the content continuity. According to an embodiment, the first UI 500 may include a first button 551 for deactivating content continuity recommendation, a second button 552 for declining current content continuity recommendation, and/or a third button 553 for approving content continuity recommendation. For example, when an input to the third button 553 is received, the first electronic device 201 may provide a second UI through the display 360.

Referring to FIG. 4, the first UI may be omitted. That is, when the content continuity recommendation is deactivated, the first electronic device 201 may not perform operations associated with the content continuity recommendation. In another example, when the first electronic device 201 is configured to always perform content continuity recommendation, the first electronic device 201 may provide a second UI 600 of FIG. 6 without providing the first UI 500.

According to various embodiments, in operation 420, the IoT APP 402 may provide the second UI.

Figure 6:
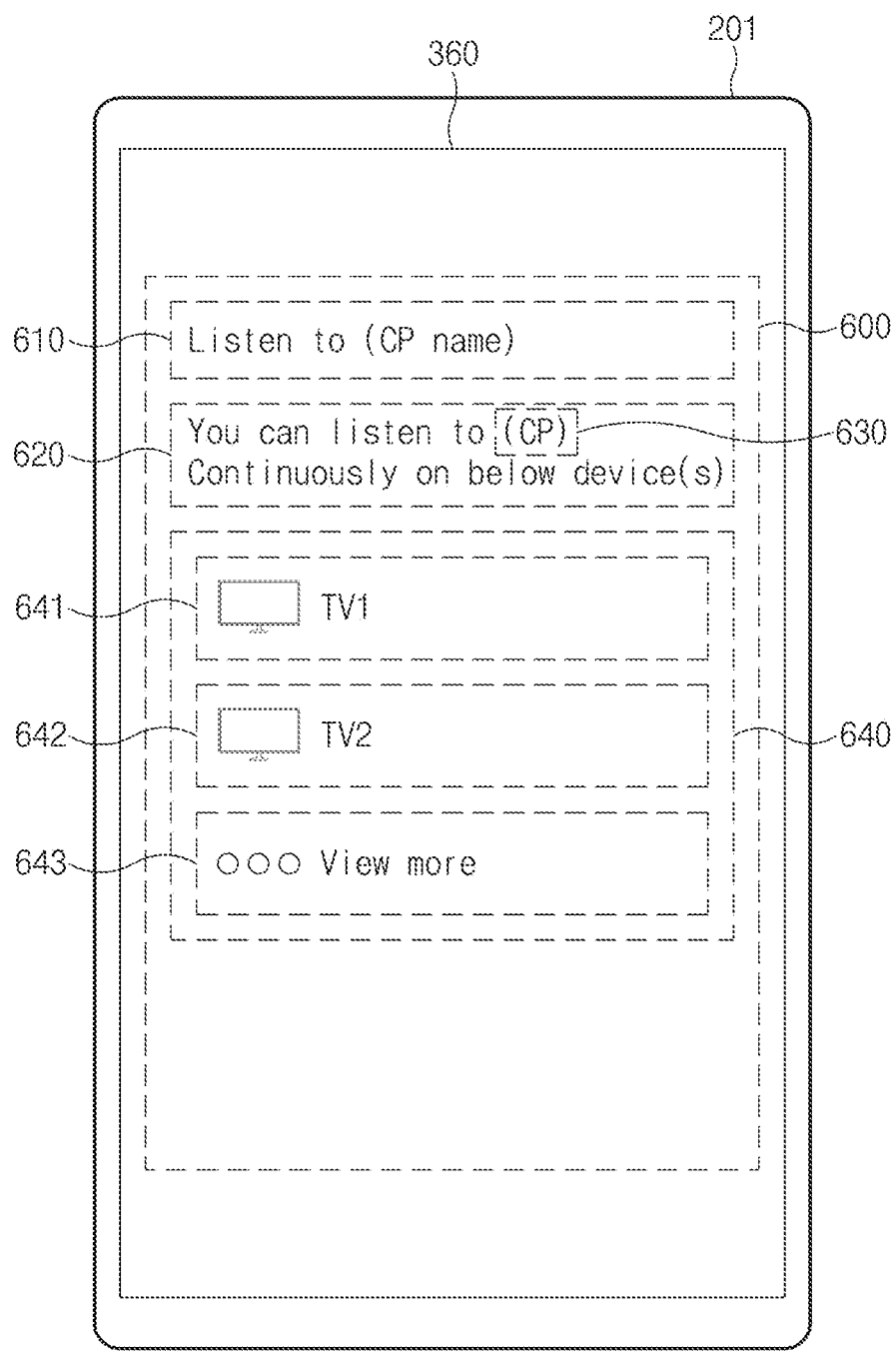
FIG. 6 illustrates a second user interface according to an embodiment of the disclosure.

FIG. 6 illustrates a second user interface according to an embodiment of the disclosure.

Referring to FIG. 6, according to various embodiments, the first electronic device 201 may display the second UI 600 in the partial region of the display 360. According to an embodiment, the second UI 600 may include CP information 610 for recommending the content continuity. For example, the CP information 610 may include the name of the CP. According to an embodiment, the second UI 600 may include a guide 620 indicating that a device supporting the content continuity has been discovered. For example, the guide 620 may include a name 630 of the CP for performing the content continuity. In another example, the name 630 of the CP may be replaced with information (e.g., the name of contents) associated with contents.

According to an embodiment, the second UI 600 may include a list 640 of continuity devices for content continuity playback. For example, the list 640 may include information of the continuity device supporting the continuity associated with the corresponding CP. For example, the list 640 may include a list of continuity devices, such as TV1 illustrated in button 641 and TV2 illustrated in button 642, which are associated with the first electronic device 201 and received from the IoT server 221. For example, the list 640 may include a list of continuity devices associated with the first electronic device 201 received from the IoT server 221, among electronic devices discovered by the first electronic device 201. For example, as illustrated in FIG. 6, at least part of discovered continuity devices may be omitted in the list 640 and may be displayed when an additional information button 643 is selected. According to an embodiment, the list 640 of continuity devices for content continuity playback may display the electronic device discovered by the first electronic device 201 and an electronic device received from the IoT server 221 to be different from each other.

Referring to FIG. 4, in operation 425, the IoT APP 402 may receive an input for the continuity device. For example, the IoT APP 402 may obtain information of a continuity device (e.g., the second electronic device 211) for performing content continuity playback by receiving a user selection to the second UI.

In operation 430, according to various embodiments, the IoT APP 402 may transmit a user activity information transfer request to the CP APP 401. For example, the user activity information transfer request may include the identifier of the selected continuity device. In operation 435, the CP APP 401 may transmit a response indicating that the transmission of the user activity information is approved or declined to the IoT APP 402.

According to an embodiment, the CP APP 401 may transmit a response, which indicates that the transmission of the user activity information is approved, to the IoT APP 402 in operation 440 and the CP APP 401 may perform remote playback control using a media router. For example, the CP APP 401 may transmit contents information (e.g., contents object) to a device corresponding to the device information received from the IoT APP 402 using the media router. For example, the contents information may include information of the contents to be played, current playback location information of contents to be played, the total number of contents items included in contents information, offset information of the corresponding contents item among the entire contents items, and/or container information of user state information. For example, when the size of contents information exceeds a specified capacity (e.g., the specified maximum capacity of an intent), the CP APP 401 may divide and transmit contents information into a plurality of messages. For example, the CP APP 401 may transmit contents information to the second electronic device 211 using the media router.

Referring to FIG. 3, according to an embodiment, when the CP supports account linking to the IoT account, the IoT server 221 may transmit information (e.g., credential) for accessing the CP server 241 to the second electronic device 211. For example, the credential may include an IoT account identifier, an IoT account user name, the client identifier obtained from the CP, a CP account identifier, an IoT account authentication code for the CP, and/or the backend endpoint address of the account server 231 for user identification. According to an embodiment, the second electronic device 211 may play the contents from the CP server 241 using the information for accessing the CP server 241. For example, the second electronic device 211 may log in to the CP server 241 with the IoT account of the user of the first electronic device 201 and the CP account connected to the IoT account using the information for accessing the CP server 241.

4-2. Content Continuity Through Link Between Clouds

Referring to FIG. 3, when the continuity link information of the CP for content continuity recommendation indicates the link between cloud services, the IoT mobile application of the first electronic device 201 may support the content continuity using the communication with the IoT server 221.

According to an embodiment, the first electronic device 201 may make a request for current user activity information to the IoT server 221. For example, for the purpose of obtaining the user activity information, the IoT server 221 may make a request for the access permission (e.g., token) for the access to the CP server 241 to the account server 231. For example, the IoT server 221 may make a request for the access permission for accessing the CP account associated with the IoT account of the first electronic device 201.

According to an embodiment, the IoT server 221 may obtain the activity information of the current user from the CP server 241 using the access permission. For example, the IoT server 221 may receive information, which is similar to the user activity information described with reference to FIG. 4, from the CP server 241.

According to various embodiments, the IoT server 221 may transmit the user activity information to the first electronic device 201 and the first electronic device 201 may determine whether to recommend the content continuity based on the user activity information. For example, when the contents being currently played is present in the user activity information or when contents played within a specified time based on the timestamp information is present, the first electronic device 201 may perform content continuity recommendation. When performing the content continuity recommendation, the first electronic device 201 may receive list information of an electronic device supporting the content continuity from the IoT server 221 with regard to the corresponding CP.

According to various embodiments, the IoT server 221 may determine whether to recommend the content continuity based on the user activity information. According to various embodiments, when it is determined that the content continuity is recommended, the IoT server 221 may transmit the list information of an electronic device supporting the content continuity to the first electronic device 201, with regard to the corresponding CP. For example, when electronic device list information is received, the first electronic device 201 may provide the first UI (e.g., the first UI 500 of FIG. 5) or the second UI (e.g., the second UI 600 of FIG. 6). For example, when the contents being currently played is present in the user activity information or when contents played within a specified time based on the timestamp information is present, the IoT server 221 may determine a content continuity recommendation.

According to various embodiments, the first electronic device 201 may receive continuity device selection by providing the second UI (e.g., the second UI 600 of FIG. 6) and then receiving an input to the second UI 600. For example, the first electronic device 201 may provide the second UI 600 based on a user input to the first UI. The description about the second UI 600 may be referenced by the description associated with the exemplification of FIG. 6.

According to an embodiment, when the continuity device is selected, the first electronic device 201 may transmit a device ready request to the IoT server 221. When the CP supports account linking but the link between the CP account and the IoT account is released, the first electronic device 201 may provide the UI indicating that account linking is released.

According to an embodiment, when a device ready request is received, the IoT server 221 may transmit a standby command (e.g., power on) to the second electronic device 211. The second electronic device 211 may turn on the power depending on the standby command. The IoT agent of the second electronic device 211 may determine whether the CP device application is currently installed in the second electronic device 211. When the CP device application is not installed, the IoT agent of the second electronic device 211 may attempt to install the CP device application. In another example, when the CP device application is not installed in the second electronic device 211, the IoT agent of the second electronic device 211 may transmit a response for canceling content continuity playback, to the IoT server 221.

According to an embodiment, the IoT agent of the second electronic device 211 may determine whether the CP device application is installed using a renderer resource (e.g., CP device application information). For example, the renderer resource may include content continuity version information, an IoT account identifier, an activated renderer identifier, and/or available renderer information in a device. The available renderer information may include at least a piece of renderer information. For example, the renderer information may include a renderer identifier, a renderer name, contents renderer support contents type (e.g., generic, movie, video, TV show, music, and/or radio), a package name of CP device application, fingerprint information indicating that a hash function of secure hash algorithm 1 (SHA1) has been applied to the signer's public key, application address information, information about an action requested from the IoT server 221 (e.g., a renderer information search request, a renderer application installation request, a user addition request, a contents playback request, and/or a renderer termination request), current state information (e.g., installation, standby, playback, termination, and/or busy of a renderer application), result information about a request action, final update time information, a session identifier (ID), credential, and/or contents information to be played based on content continuity playback. For example, the credential may include an IoT account identifier, an IoT account user name, the client identifier obtained from the CP, a CP account identifier, an IoT account authentication code for the CP, and/or the backend endpoint address of the account server 231 for user identification.

According to various embodiments, when the second electronic device 211 is ready, the first electronic device 201 request an approval code 'authcode' of an IoT account for the CP account from the account server 231. For example, the first electronic device 201 may obtain information indicating that the second electronic device 211 is ready through the IoT server 221.

According to various embodiments, when the approval code is received, the first electronic device 201 may transmit a playback request to the IoT server 221. For example, the playback request may include the approval code, the device identifier of the second electronic device 211, and a CP account identifier.

According to various embodiments, when the playback request is received, the IoT server 221 may obtain access permission (e.g., a token) about the CP server 241 from the account server 231 using the approval code included in the playback request. The IoT server 221 may obtain the user activity information (e.g., whether contents being played currently are present, recently played contents information (e.g., timestamp information of recently played contents), linked account information (e.g., CP account information associated with the IoT account of the user of the first electronic device 201), item information, progress information (e.g., the current or last playback progress position of contents), offset information, and/or the number of available items) using the obtained access permission. The description about user activity information may be referenced by the description about the contents connectivity based on the link between applications.

According to an embodiment, the IoT server 221 may transmit a playback request to the IoT agent of the second electronic device 211. For example, the playback request may include at least part of user activity information, an authentication code, IoT account information, CP account information, a CP client identifier, and/or link information between a CP device application and an IoT agent. For example, the second electronic device 211 may log in to the CP server 241 using the authentication code, the IoT account information, and the CP client identifier.

According to an embodiment, when the second electronic device 211 logs in to the CP server 241 by using the account of the first electronic device 201, the first electronic device 201, which is logged in to the CP server 241 with the same account, may be logged out. For example, the second electronic device 211 may perform content continuity playback by receiving a stream from the CP server 241. For example, when the second electronic device 211 interrupts (i.e., terminates) the content continuity playback, the first electronic device 201 may perform the content continuity playback from a time point corresponding to a time point at which the playback of the second electronic device 211 is interrupted after logging in to the CP server 241 again.

According to an embodiment, the second electronic device 211 logs in to the CP server 241 by using the account of the first electronic device 201, the first electronic device 201 may interrupt the playback of contents being played. For example, while the second electronic device 211 performs the content continuity playback, the first electronic device 201 may remain in a state where the first electronic device 201 logs in to the CP server 241. For example, when the second electronic device 211 interrupts (i.e., terminates) the content continuity playback, the first electronic device 201 may perform the content continuity playback from a time point corresponding to a time point at which the playback of the second electronic device 211 is interrupted.

According to an embodiment, when the first electronic device 201 discovers the second electronic device 211 by performing NFC, Wi-Fi communication, EM sensing, Bluetooth communication, BLE communication, sound recognition, ultrasound communication, user voice recognition, or NAN communication, even though the first electronic device 201 does not receive a user input, the first electronic device 201 may support content continuity playback through the second electronic device 211. For example, when the first electronic device 201 is configured to always perform content continuity recommendation and when the second electronic device 211 supports content continuity playback, the first electronic device 201 may support content continuity playback through the second electronic device 211 without a user input. For example, the second electronic device 211 may be an electronic device having the history of supporting the content continuity playback through the first electronic device 201.

Figure 7:
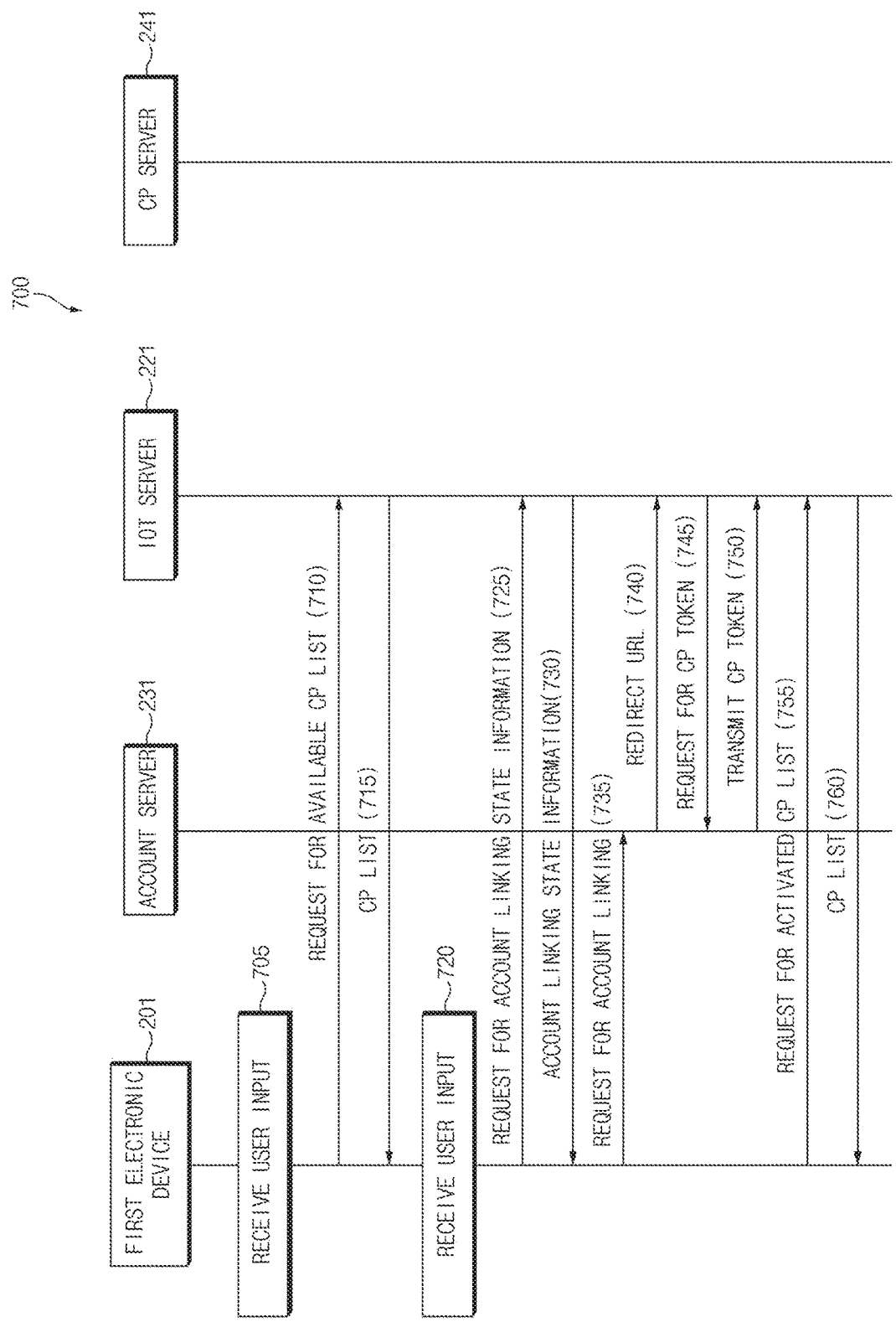
FIG. 7 illustrates a signal flowchart of a content provider (CP) registering method, according to an embodiment of the disclosure.

FIG. 7 illustrates a signal flowchart of a CP registering method according to an embodiment of the disclosure.

Referring to FIG. 7, a registering method 700 is illustrated. In operation 705, the first electronic device 201 may receive a user input for CP registration. For example, in operation 705, the first electronic device 201 may receive a user input to make a request for the provision of a CP list. For example, the request for the CP list may include a request for information of CPs supporting account linking to an IoT account.

According to various embodiments, in operation 710, the first electronic device 201 may transmit an available CP list request to the IoT server 221. For example, the first electronic device 201 may transmit the available CP list request in response to the reception of the user input.

According to various embodiments, in operation 715, the IoT server 221 may transmit the CP list to the first electronic device 201. For example, the IoT server 221 may generate a list of CPs supporting the account linking to the IoT account of the first electronic device 201 using the CP metadata of the IoT server 221 and may transmit the generated CP list to the first electronic device 201.

Figure 8:
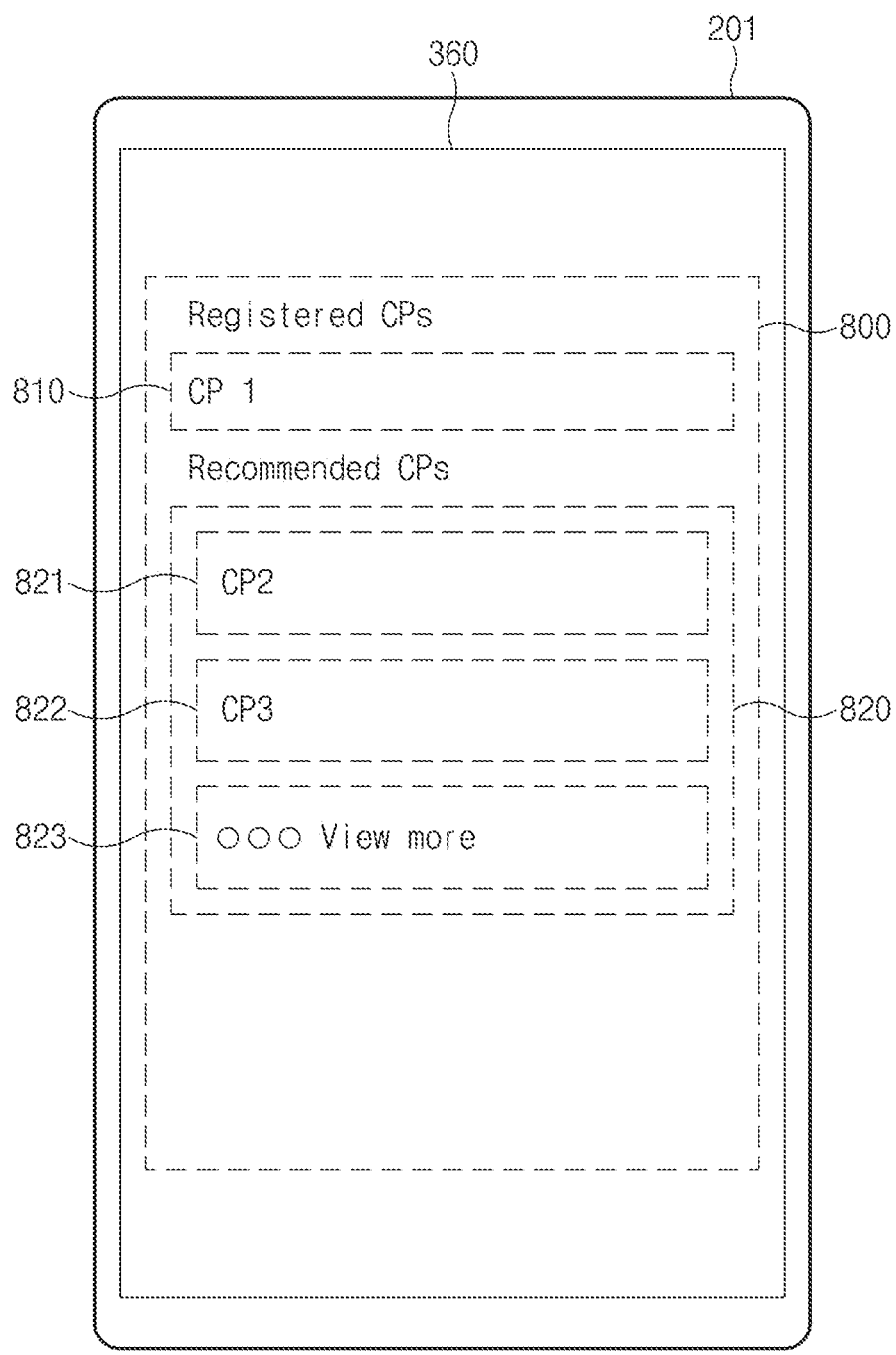
FIG. 8 illustrates a third user interface according to an embodiment of the disclosure.

FIG. 8 illustrates a third user interface according to an embodiment of the disclosure.

Referring to FIG. 8, a user interface is illustrated. Referring to FIGS. 7 and 8, in operation 720, the first electronic device 201 may receive a user input. For example, the first electronic device 201 may provide a third UI and may receive a user input to the third UI. Referring to FIG. 8, according to various embodiments, the first electronic device 201 may provide a third UI 800 through the display 360 based on a user input (e.g., a user input to the CP list). According to an embodiment, the third UI 800 may include a CP list 810 currently registered in the IoT account of the first electronic device 201 and a recommendation CP list 820. For example, the registered CP list 810 may include information of the CP corresponding to the CP account connected to the IoT account of the first electronic device 201 and stored in the account server 231. For example, the recommendation CP list 820 may include a list of CPs (i.e., CPs supporting the account linking to the IoT account), such as CP2 in indication 821 and CP2 in indication 822, that are capable of being connected to the IoT account even though not being connected to the IoT account of the first electronic device 201. For example, the recommendation CP list 820 may include at least part of the CP list received from the IoT server 221. For example, a part of the registration CP list 810 and/or the recommendation CP list 820 may be omitted together with an omission indication 823.

Referring to FIG. 7, according to an embodiment, when an input to one CP (i.e., indication 821 or indication 822) of the recommendation CP list 820 of FIG. 8 is received, in operation 725, the first electronic device 201 may transmit a link state information request of the CP account for the CP corresponding to the received input to the IoT server 221. For example, the account linking state information may include information indicating whether the account of the CP corresponding to the received input is linked to the IoT account of the first electronic device 201.

According to various embodiments, in operation 730, the first electronic device 201 may receive the account linking state information from the IoT server 221. For example, the account linking state information may include information indicating that the IoT account of the first electronic device 201 is not linked to the CP account.

According to an embodiment, in operation 710, the first electronic device 201 may receive the CP list including CP information that is not associated with the IoT account of the first electronic device 201 from the IoT server 221. In this case, operation 725 and operation 730 may be omitted.

According to various embodiments, when the account linking state information indicates that the IoT account of the first electronic device 201 is not linked to the CP account, in operation 735, the first electronic device 201 may transmit the account linking request to the account server 231. For example, the account linking request may include the IoT account, the account linking of which is requested, and/or information of the CP account.

According to various embodiments, in operation 740, the account server 231 may transmit redirect URL to the IoT server 221. For example, the account server 231 may transmit the backend endpoint address of the account server 231 to the IoT server 221.

According to various embodiments, in operation 745, the IoT server 221 may request a CP token for access to the CP account from the account server 231 by using the received URL. In operation 750, the account server 231 may transmit the CP token to the IoT server 221. For example, the IoT server 221 may connect the CP account corresponding to the CP token to the IoT account of the first electronic device 201, using the CP token.

According to various embodiments, in operation 755, the first electronic device 201 may request the activated CP list. For example, the first electronic device 201 may request the CP list information corresponding to the CP account linked to the IoT account in the IoT server 221. In operation 760, the IoT server 221 may transmit the CP list corresponding to CP accounts linked to the IoT account of the first electronic device 201, to the first electronic device 201. For example, the information of the CP registered depending on the above-described CP registration method may be added to the registration CP list 810 of the third UI 800 of FIG. 8 and may be displayed.

Figure 9:
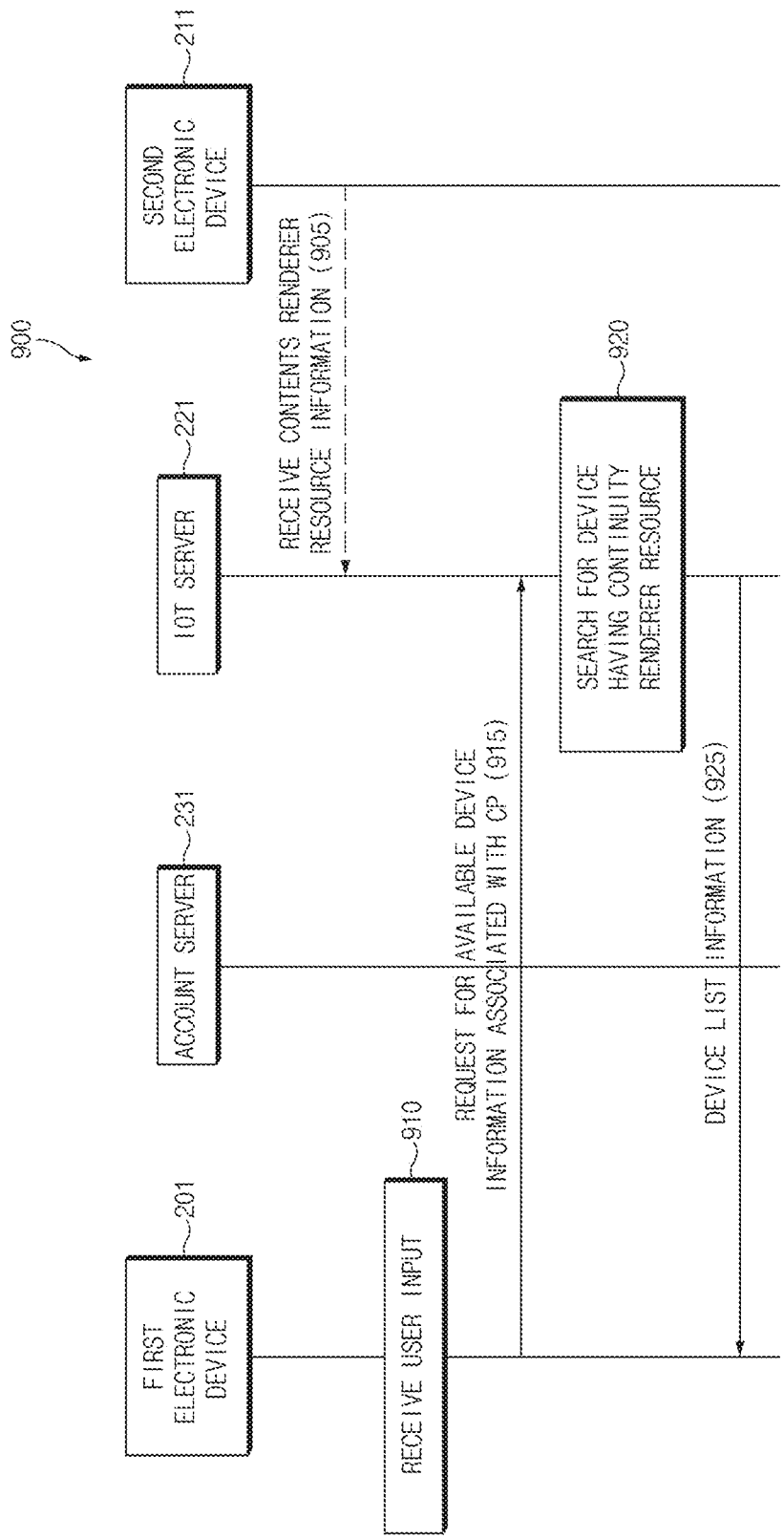
FIG. 9 illustrates a signal flowchart of a device searching method according to an embodiment of the disclosure.

FIG. 9 illustrates a signal flowchart of a device searching method according to an embodiment of the disclosure.

Referring to FIG. 9, a signal flowchart 900 is illustrated. According to various embodiments, in operation 905, the IoT server 221 may receive contents renderer resource information from at least one electronic device (e.g., the second electronic device 211). For example, the contents renderer resource information may include information of a CP device application installed in the second electronic device 211. For example, the contents renderer resource information may include information about whether the second electronic device 211 supports content continuity.

According to various embodiments, in operation 910, the first electronic device 201 may receive a user input. According to an embodiment, the first electronic device 201 may provide an UI (e.g., the first UI 500 of FIG. 5) for content continuity recommendation, based on a specified condition and may receive a user input to the UI.

According to various embodiments, in operation 915, the first electronic device 201 may request available device information associated with the CP in which the content continuity is recommended, in response to a user input (e.g., a content continuity playback request). In operation 920, the IoT server 221 may search for a device having a continuity renderer resource. For example, with regard to the CP associated with the requested content continuity playback, the IoT server 221 may search for an electronic device (e.g., the second electronic device 211) capable of supporting the content continuity associated with the IoT account of the first electronic device 201 using the application metadata of the IoT server 221. In operation 925, the IoT server 221 may transmit the device list information to the first electronic device 201. For example, the device list information may include information of a continuity device (e.g., the second electronic device 211) supporting the content continuity. For example, the first electronic device 201 may provide a user interface (e.g., the second UI 600 of FIG. 6) for device selection, using the received device list information.

Figure 10:
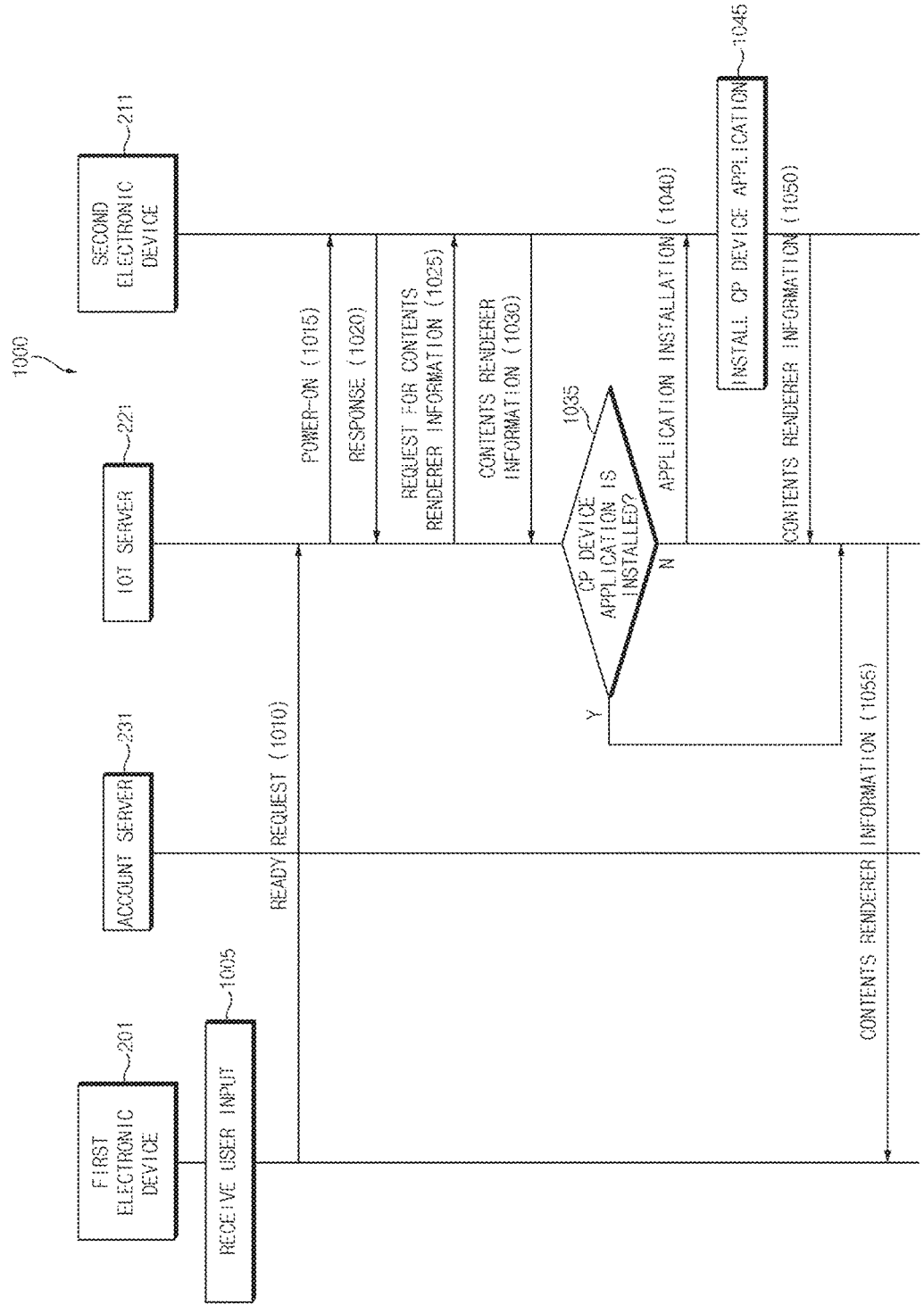
FIG. 10 illustrates a signal flowchart of a device setting method according to an embodiment of the disclosure.

FIG. 10 illustrates a signal flowchart of a device setting method according to an embodiment of the disclosure.

Referring to FIG. 10, a signal flowchart 1000 is illustrated. According to various embodiments, in operation 1005, the first electronic device 201 may receive a user input. For example, the first electronic device 201 may receive an input to a second UI (e.g., the second UI 600 of FIG. 6) as a selection input of an external electronic device for content continuity playback.

According to various embodiments, the first electronic device 201 may transmit a ready request of a continuity electronic device (e.g., the second electronic device 211) to the IoT server 221 in operation 1010. For example, the ready request may include information of the target continuity electronic device and/or information of the CP in which content continuity playback is requested.

According to various embodiments, in operation 1015, the IoT server 221 may direct the second electronic device 211 to be powered on. In operation 1020, the second electronic device 211 may transmit a response to the IoT server 221 after being powered on.

According to an embodiment, the first electronic device 201 may obtain the state information of the second electronic device 211 from the IoT server 221 or the second electronic device 211. For example, the first electronic device 201 may obtain information indicating whether the second electronic device 211 is in an on state, a standby state, or an off state, from the IoT server 221 or the second electronic device 211. For example, when the state of the second electronic device 211 indicates the on state, operation 1015 and operation 1020 described above may be omitted. In another example, the IoT server 221 may manage information indicating whether the second electronic device 211 is in an on state, a standby state, or an off state. When the IoT server 221 determines that the second electronic device 211 is in the on state, operation 1015 and operation 1020 described above may be omitted.

According to various embodiments, in operation 1025, the IoT server 221 may make a request for contents renderer information (e.g., the CP device application state information of the second electronic device 211). In operation 1030, the second electronic device 211 may transmit the requested contents renderer information to the IoT server 221. For example, the contents renderer information may include the information (e.g., the identifier, name, and/or support contents type information) of CP and CP device application information (e.g., CP device application state information). For example, the IoT server 221 may determine whether a CP device application is currently installed in the second electronic device 211, using contents renderer information.

According to various embodiments, in operation 1035, the IoT server 221 may determine whether the CP device application (the CP device APP) corresponding to the CP information that is included in the ready request is installed in the second electronic device 211 using contents renderer information. For example, the IoT server 221 may determine whether the CP device application of the CP requested by the first electronic device 201 is installed in the second electronic device 211 using the information of the CP and the CP device application information included in the contents renderer information.

According to various embodiments, in operation 1040, when the CP device application is not installed, the IoT server 221 may request the second electronic device 211 to install the CP device application. For example, the IoT server 221 may transmit an address (e.g., a download address) for installing the CP device application, to the second electronic device 211. According to an embodiment, in operation 1045, the second electronic device 211 may install the CP device application based on the application installation request from the IoT server 221. For example, the second electronic device 211 may download the CP device application using the address (e.g., the download address of the CP device application of the CP server 241) received from the IoT server 221 and may install the downloaded CP device application. According to an embodiment, in operation 1050, the second electronic device 211 may transmit contents renderer information including information of the installed CP device application, to the IoT server 221. According to an embodiment, when the contents renderer information including the CP device application information of the ready-requested CP is received, in operation 1055, the IoT server 221 may transmit the received contents renderer information to the first electronic device 201.

According to various embodiments, in operation 1055, the IoT server 221 may transmit the contents renderer information received from the second electronic device 211 in which the CP device application is installed to the first electronic device 201.

Figure 11:
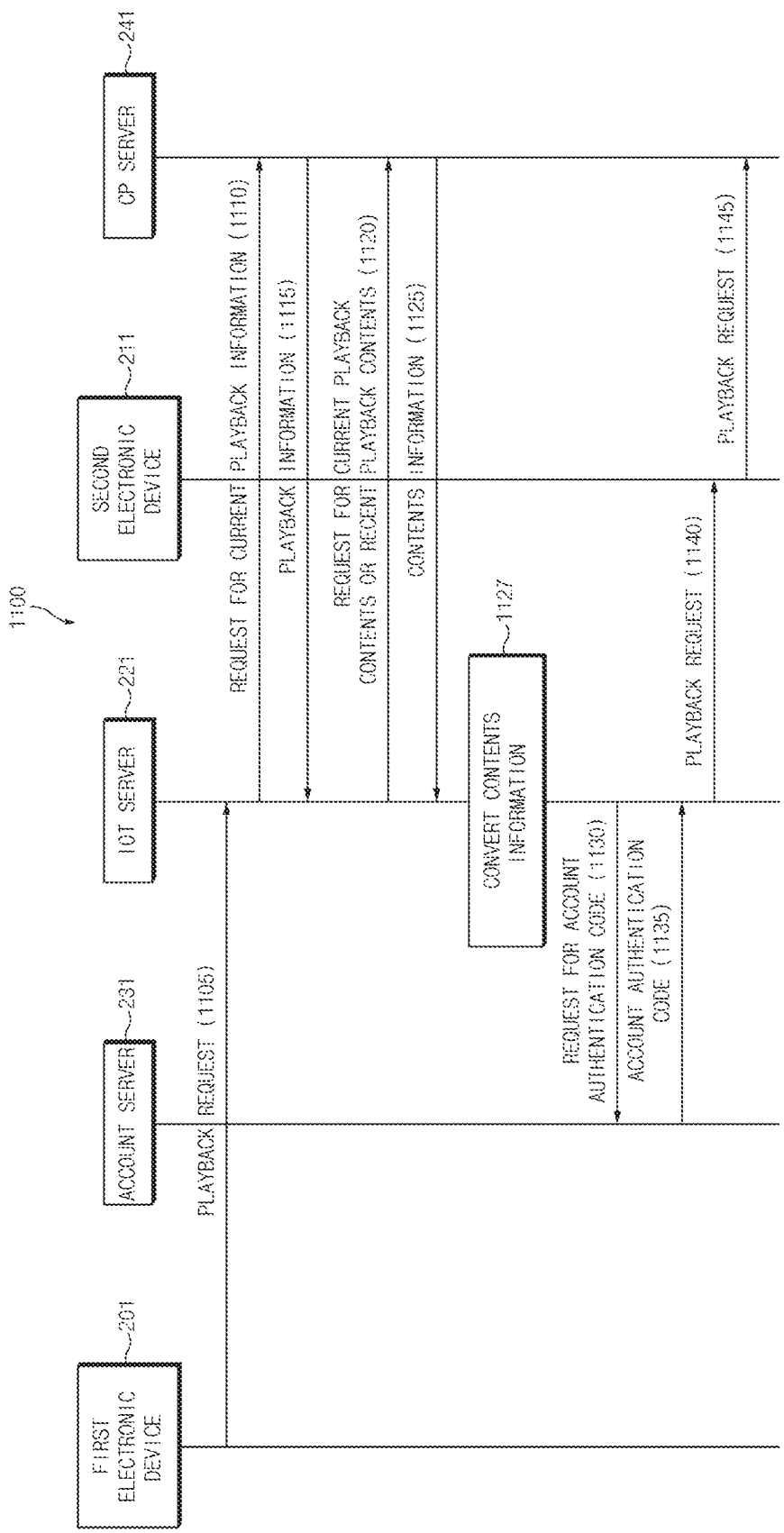
FIG. 11 illustrates a signal flowchart of a contents playing method according to an embodiment of the disclosure.

FIG. 11 illustrates a signal flowchart of a contents playing method according to an embodiment of the disclosure.

Referring to FIG. 11, a signal flowchart 1100 is illustrated. In operation 1105, the first electronic device 201 may transmit a playback request to the IoT server 221. For example, when the contents renderer information received from the IoT server 221 indicates that the content continuity of the second electronic device 211 is available, the first electronic device 201 may transmit a playback request to the IoT server 221. For example, the playback request may include CP information of the playback-requested contents.

According to various embodiments, in operation 1110, the IoT server 221 may transmit current playback information to the CP server 241. In operation 1115, the CP server 241 may transmit the playback information (e.g., whether contents are currently played and/or the playback progress information of contents) associated with the CP account of the first electronic device 201, to the IoT server 221. In operation 1120, the IoT server 221 may transmit a request for information about current playback contents or recent playback contents, to the CP server 241. In operation 1125, the CP server 241 may transmit information (e.g., at least part of the user activity information described with reference to FIG. 3) of the current playback contents or the recent playback contents to the IoT server 221. In operation 1127, the IoT server 221 may convert the CP specific contents information in the format for supporting content continuity.

According to various embodiments, in operation 1130, the IoT server 221 may transmit an account authentication code request for accessing the CP server 241, to the account server 231. In operation 1135, the account server 231 may transmit the account authentication code to the IoT server 221.

According to various embodiments, in operation 1140, the IoT server 221 may transmit a playback request to the second electronic device 211. For example, the playback request may include credential information received from the account server 231 and contents information to be played. In operation 1145, the second electronic device 211 may transmit the playback request to the CP server 241 based on the received credential information and the contents information to be played.

Figure 12:
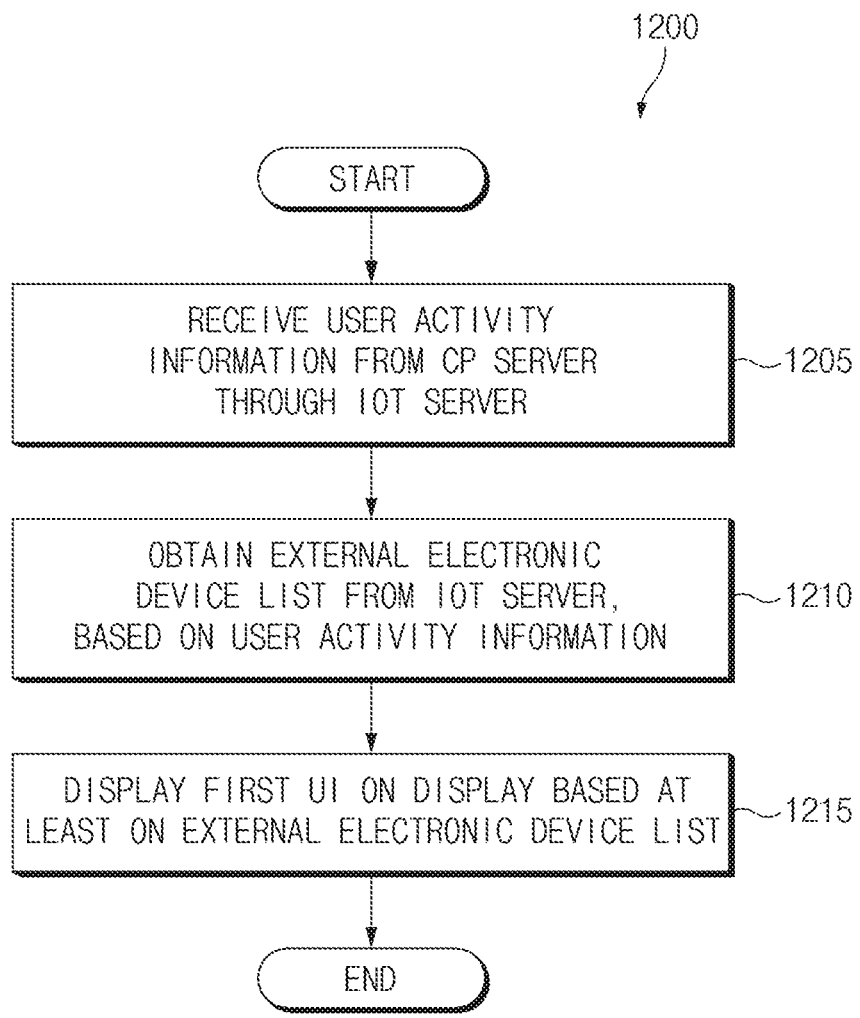
FIG. 12 is a flowchart of a content continuity recommending method of a first electronic device according to an embodiment of the disclosure.

FIG. 12 is a flowchart of a content continuity recommending method of a first electronic device, according to an embodiment of the disclosure.

Referring to FIG. 12, a flowchart 1200 is illustrated in which the first electronic device 201 may include a display (e.g., the display 360 of FIG. 3), a communication circuit (e.g., the communication circuit 390 of FIG. 3), a processor (e.g., the processor 320 of FIG. 3) operatively connected to the display and the communication circuit, and a memory (e.g., the memory 331 of FIG. 3) operatively connected to the processor.

According to various embodiments, in operation 1205, the first electronic device 201 may receive user activity information from the CP server 241 through the IoT server 221. For example, the user activity information may include information of contents, which is being currently played in the first electronic device 201 or was played previously in the first electronic device 201. According to an embodiment, when one or more external electronic devices (e.g., the second electronic device 211 of FIG. 2) is discovered, the first electronic device 201 may receive user activity information from the CP server 241 through the IoT server 221. For example, the first electronic device 201 may obtain the user activity information using the methods described above in FIGS. 3 to 5. For example, the first electronic device 201 may discover one or more external electronic devices by performing NFC, Wi-Fi communication, EM sensing, Bluetooth communication, BLE communication, sound recognition, ultrasonic communication, user voice recognition, or NAN communication using a communication circuit.

According to various embodiments, in operation 1210, the first electronic device 201 may obtain an external electronic device list from the IoT server 221 based at least on user activity information. For example, the external electronic device list may include an external electronic device (e.g., the second electronic device 211), which supports the contents playback of the CP associated with content continuity playback or which supports content continuity, from among the external electronic devices (e.g., external electronic devices registered in the IoT account of the first electronic device 201) associated with the first electronic device 201. According to an embodiment, when the user activity information indicates that the contents is currently being played in the first electronic device 201 or indicates that the contents has been played in the first electronic device 201 within a specified time, the first electronic device 201 may obtain the list of external electronic devices from the IoT server 221. For example, the first electronic device 201 may obtain an external electronic device list by performing operation 915, operation 920, and operation 925 of FIG. 9.

According to various embodiments, in operation 1215, the first electronic device 201 may display the first UI (e.g., the first UI 500 of FIG. 5) on a display, based at least on the external electronic device list. For example, the first electronic device 201 may display the first UI on the display, based on the discovered external electronic device and the received external electronic device list. For example, the first UI may be a UI for recommending playing the contents, which is being currently played or was played previously, through an external electronic device (e.g., the second electronic device 211). According to an embodiment, when at least one external electronic device included in both the list of the discovered one or more external electronic devices and the received list of external electronic devices is present, the first electronic device 201 may display the first UI on the display.

According to various embodiments, when an input to the first UI for making a request for content continuity playback is received, the first electronic device 201 may display a second UI (e.g., the second UI 600 of FIG. 6) including a list of at least one external electronic device included in both the list of the discovered one or more external electronic devices and the received list of external electronic devices on the display. According to an embodiment, when an input to the external electronic device list of the second UI is received, the first electronic device 201 may play contents, using the external electronic device corresponding to the user input. For example, the first electronic device 201 may play contents, using an external electronic device corresponding to the user input by transmitting a playback request to the IoT server 221. For example, the playback request may include the identification information of an external electronic device, the CP identifier of contents, and/or access permission information about the CP of the first electronic device 201.

Figure 13:
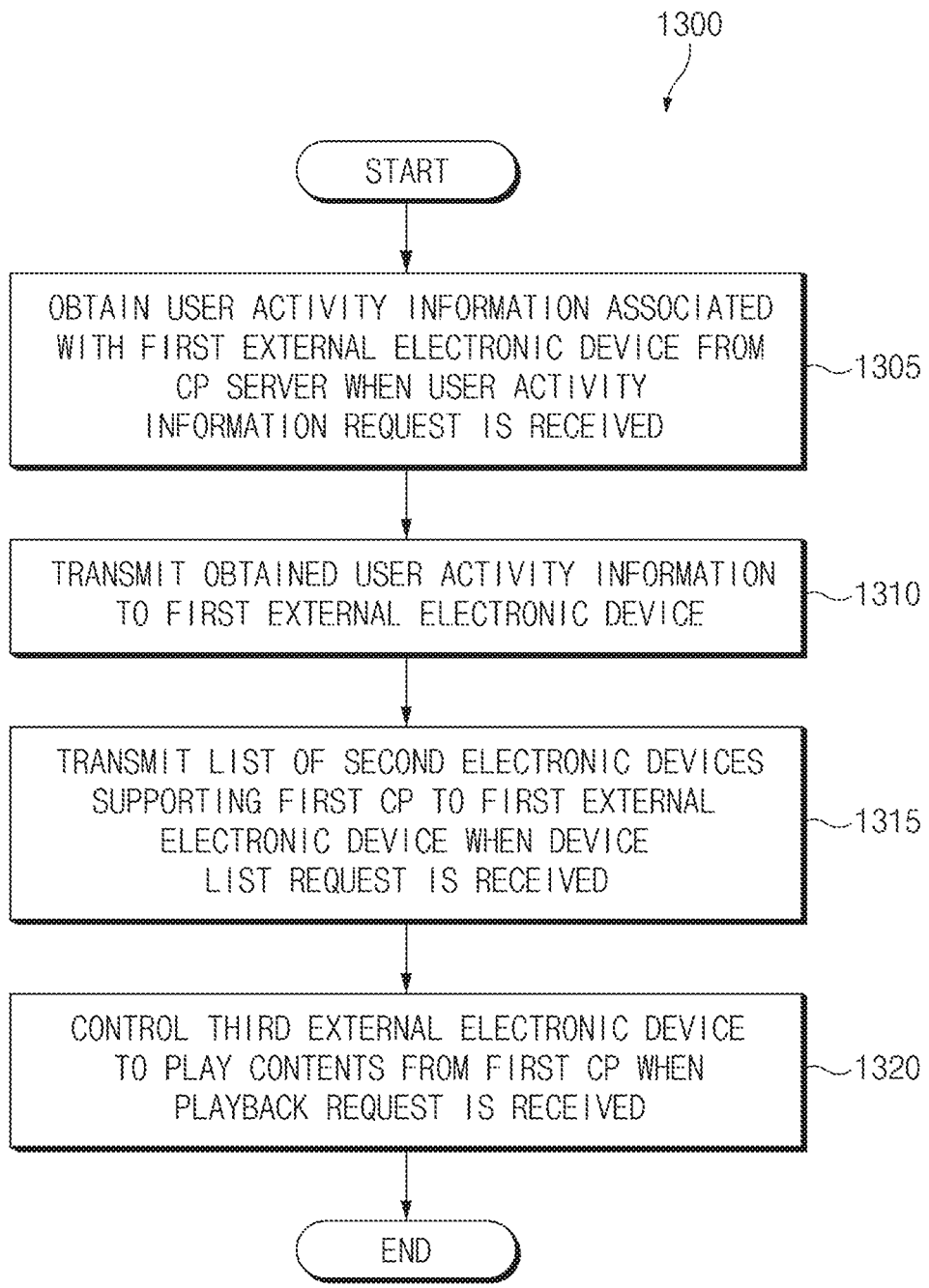
FIG. 13 is a flowchart of a content continuity playing method of an internet of things (IoT) server according to an embodiment of the disclosure.

FIG. 13 is a flowchart of a content continuity playing method of an IoT server according to an embodiment of the disclosure.

Referring to FIG. 13, a method of continuously playing content is illustrated. According to various embodiments, the IoT server 221 may include at least one communication circuit (e.g., the communication module 190 of FIG. 1), a processor (e.g., the processor 120 of FIG. 1) operatively connected to the at least one communication circuit, and a memory (e.g., the memory 130 of FIG. 1) electrically connected to the processor and configured to store CP metadata.

According to various embodiments, when a user activity information request is received from a first external electronic device (e.g., the first electronic device 201), in operation 1305, the IoT server 221 may obtain the user activity information associated with the first external electronic device from the CP server 241. For example, the user activity information request may include the identifier of the first CP. For example, the user activity information may include at least one of information indicating that the contents of the first CP is being currently played in the first external electronic device or information indicating a point in time when the contents of the first CP is played in the first external electronic device. According to an embodiment, when a user activity information request is received from the first external electronic device, the IoT server 221 may obtain the permission of access to the CP server 241 of the CP associated with the first external electronic device from the account server 231 and may obtain the user activity information associated with the first external electronic device from the CP server 241 using the access permission.

According to various embodiments, in operation 1310, the IoT server 221 may transmit the obtained user activity information to the first external electronic device.

According to various embodiments, in operation 1315, when a device list request is received from the first external electronic device, the IoT server 221 may transmit the list of at least one second electronic device supporting the first CP to the first external electronic device. For example, the IoT server 221 may transmit the list of second electronic devices supporting the first CP among second electronic devices associated with the first external electronic device to the first external electronic device. For example, the device list request may include the identifier of the first CP.

According to various embodiments, in operation 1320, when a playback request is received from the first external electronic device, the IoT server 221 may control a third external electronic device (e.g., the second electronic device 211 of FIG. 2) to play the contents from the first CP. For example, when the playback request is received from the first external electronic device, the IoT server 221 may transmit a command to power up to the third external electronic device and then may control the third external electronic device to be in a ready state. For example, the playback request may include an identification request for the third electronic device of the second electronic devices. According to an embodiment, when a playback request is received, the IoT server 221 may obtain the permission of the access to the CP server 241 associated with the first external electronic device, from the account server 231. The IoT server 221 may obtain the user activity information associated with the first external electronic device, from the CP server 241 by using the access permission. The IoT server 221 may transmit information for the access to the CP server 241, to the third external electronic device.

Figure 14:
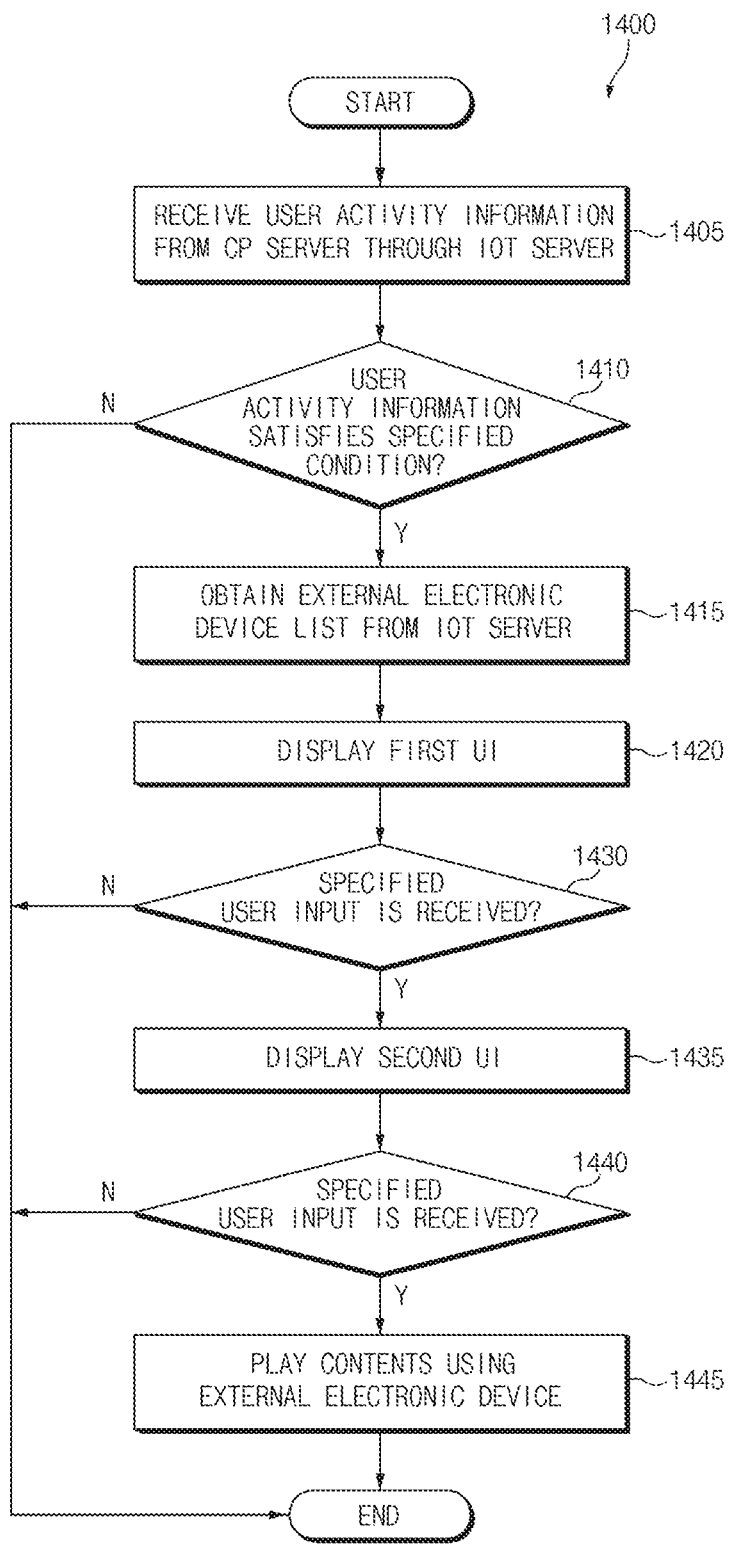
FIG. 14 is a flowchart of a content continuity playing method of a first electronic device according to an embodiment of the disclosure.

FIG. 14 is a flowchart of a content continuity playing method of a first electronic device according to an embodiment of the disclosure.

Referring to FIG. 14, a flowchart 1400 is illustrated for continuously playing content. The first electronic device 201 may include a display (e.g., the display 360 of FIG. 3), a communication circuit (e.g., the communication circuit 390 of FIG. 3), a processor (e.g., the processor 320 of FIG. 3) operatively connected to the display and the communication circuit, and a memory (e.g., the memory 331 of FIG. 3) operatively connected to the processor.

According to an embodiment, when an external electronic device (e.g., the second electronic device 211) is discovered, the first electronic device 201 may receive user activity information from the CP server 241 through the IoT server 221. For example, the first electronic device 201 may discover one or more external electronic devices by performing NFC, Wi-Fi communication, EM sensing, Bluetooth communication, BLE communication, sound recognition, ultrasonic communication, user voice recognition, or NAN communication using a communication circuit.

According to various embodiments, in operation 1405, the first electronic device 201 may receive user activity information from the CP server 241 through the IoT server 221. For example, the user activity information may include information of contents, which is being currently played in the first electronic device 201 or was played previously in the first electronic device 201. According to an embodiment, when one or more external electronic devices (e.g., the second electronic device 211 of FIG. 2) is discovered, the first electronic device 201 may receive user activity information from the CP server 241 through the IoT server 221. For example, the first electronic device 201 may obtain the user activity information, using the methods described above in FIGS. 3 to 5.

According to various embodiments, in operation 1410, the first electronic device 201 may determine whether the user activity information satisfies a specified condition. According to an embodiment, when the user activity information indicates that the contents is being currently played in the first electronic device 201 or indicates that the contents has been played in the first electronic device 201 within a specified time, the first electronic device 201 may determine that a specified condition is satisfied. For example, the first electronic device 201 may obtain an external electronic device list by performing operation 915, operation 920, and operation 925 of FIG. 9.

According to various embodiments, when the user activity information satisfies the specified condition, in operation 1415, the first electronic device 201 may obtain the external electronic device list from the IoT server 221. For example, the external electronic device list may include an external electronic device (e.g., the second electronic device 211), which supports the contents playback of the CP associated with content continuity playback or which supports content continuity, from among the external electronic devices (e.g., external electronic devices registered in the IoT account of the first electronic device 201) associated with the first electronic device 201.

According to various embodiments, in operation 1420, the first electronic device 201 may display the first UI (e.g., the first UI 500 of FIG. 5) on a display based at least on the external electronic device list. For example, the first electronic device 201 may display the first UI on the display based on the discovered external electronic device and the external electronic device list received from the IoT server 221. For example, the first UI may be a UI for recommending playing contents, which is being currently played or was played previously, through an external electronic device (e.g., the second electronic device 211). According to an embodiment, when at least one external electronic device included in both the list of the discovered one or more external electronic devices and the received list of external electronic devices is present, the first electronic device 201 may display the first UI on the display.

According to various embodiments, in operation 1430, the first electronic device 201 may determine whether a specified user input to the first UI is received. For example, the specified user input may correspond to the request of the content continuity playback. For example, the input may include a touch input and/or a voice command.

According to various embodiments, when an input to the first UI for requesting content continuity playback is received, in operation 1435, the first electronic device 201 may display a second UI (e.g., the second UI 600 of FIG. 6) including a list of at least one external electronic device included in both the list of the discovered one or more external electronic devices and the received list of external electronic devices on the display.

According to various embodiments, in operation 1440, the first electronic device 201 may determine whether a specified user input to the second UI is received. For example, the specified user input may include an input to the external electronic device list the second UI. For example, the specified user input may include an input corresponding to one external electronic device in the displayed list of external electronic devices.

According to various embodiments, when an input to the external electronic device list of the second UI is received, in operation 1445, the first electronic device 201 may play contents using the external electronic device corresponding to the user input. For example, the first electronic device may play contents, using an external electronic device corresponding to the user input, by transmitting a playback request to the IoT server 221. For example, the playback request may include the identification information of an external electronic device, the CP identifier of contents, and/or access permission information about the CP of the first electronic device 201. According to an embodiment, the first electronic device 201 may interrupt contents playback depending on the contents playback using the external electronic device. For example, the first electronic device 201 may be logged out from the CP server 241. In another example, the first electronic device 201 may maintain a state where the first electronic device 201 is logged in to the CP server 241.

Figure 15:
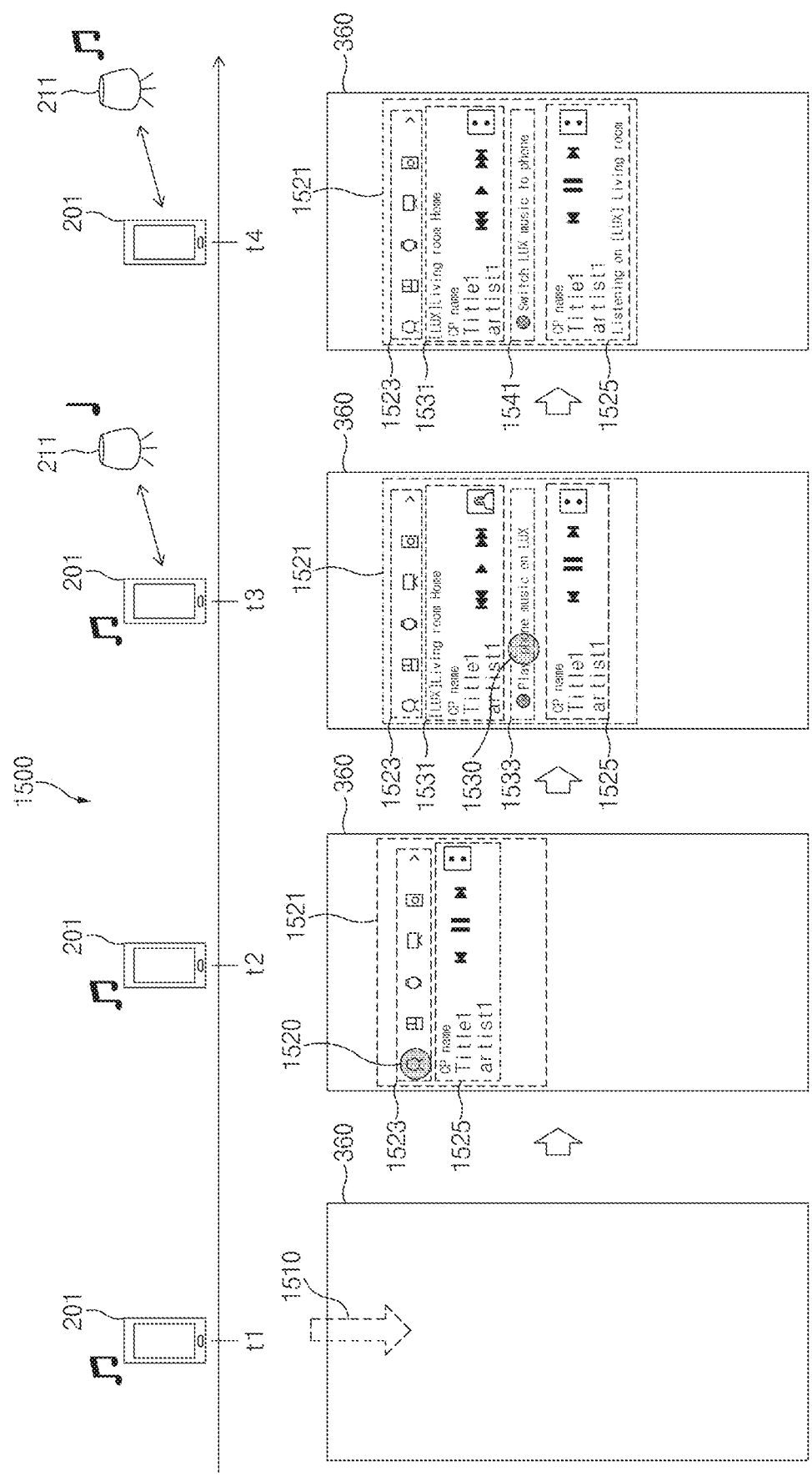
FIG. 15 illustrates a conceptual diagram of content continuity playback from a first electronic device to a second electronic device according to an embodiment of the disclosure.

FIG. 15 illustrates a conceptual diagram of content continuity playback from a first electronic device to a second electronic device according to an embodiment of the disclosure.

Referring to FIG. 15, a conceptual diagram illustrating an example of continuous content playback is illustrated. At a time point t1, the first electronic device 201 may be playing a first multimedia (e.g., first music) from a first CP (e.g., the CP server 241). According to an embodiment, at the time point t1, the first electronic device 201 may receive a first input 1510 to the display 361. For example, the first input 1510 may be a drag input or a swipe input in a specified direction (e.g., the lower direction of the display 360) from a specified region (e.g., the upper region of the display 360) of the display 360. The specified region and the specified direction may be relatively set depending on the current setting (e.g., a portrait mode or a landscape mode) of the display 360.

According to an embodiment, at a time point t2, the first electronic device 201 may display a state UI 1521 on the display 360 in response to the first input 1510. For example, the state UI 1521 may include information associated with the state and/or the setting of the first electronic device 201. According to an embodiment, the state UI 1521 may include an external electronic device list UI 1523 and a playback state UI 1525. For example, the external electronic device list UI 1523 may include the list of external electronic devices associated with the first electronic device 201. The list of external electronic devices may include icons corresponding to the external electronic devices. For example, the first electronic device 201 may include the list of external electronic devices received from the IoT server 221 or the list of external electronic devices stored in the first electronic device 201 in the external electronic device list UI 1523. For example, the playback state UI 1525 may include an interface for information (e.g., a CP name, a title, an artist, and/or a related image) about first multimedia, which is being currently played in the first electronic device 201, and the playback control (e.g., playback start, playback pause, playback end, previous multimedia playback, and/or next multimedia playback) of the first multimedia.

According to an embodiment, at the time point t2, the first electronic device 201 may receive a second input 1520 to the icon corresponding to the second electronic device 211 of the external electronic device list UI 1523. For example, the second input 1520 may be a touch input to an icon.

According to an embodiment, at a time point t3, the first electronic device 201 may connect to the second electronic device 211 in response to the reception of the second input 1520. For example, the second electronic device 211 may be an IoT device supporting content continuity and may be an electronic device in which the CP device application associated with the first CP is installed. For example, the second electronic device 211 may be a smart speaker or an artificial intelligence (AI) speaker.

According to an embodiment, at the time point t3, the first electronic device 201 may change the icon corresponding to the second electronic device 211 of the external electronic device list UI 1523 in response to the connection to the second electronic device 211. For example, when the first electronic device 201 is connected to the second electronic device 211, the first electronic device 201 may change at least one of the image, color, transparency, size, brightness, contrast, and/or shape of an icon corresponding to the second electronic device 211.

For example, at the time point t3, the second electronic device 211 may have been previously playing second multimedia (e.g., a second music) from the first CP. According to an embodiment, the first electronic device 201 may display an external electronic device playback state UI 1531 in the state UI 1521. For example, the external electronic device playback state UI 1531 may include an interface for information (e.g., the name (e.g., AI speaker living room) of the second electronic device 211 and/or place information (e.g., Home) associated with the second electronic device 211)) of the second electronic device 211, information (e.g., a CP name, a title, an artist, and/or a related image) about second multimedia, which is being played in the currently connected second electronic device 211, and the playback control (e.g., playback start, playback pause, playback end, previous multimedia playback, and/or next multimedia playback) of the second multimedia. For example, the first electronic device 201 may obtain the information of the second electronic device 211 and information of the second multimedia through the IoT server 221.

According to an embodiment, at the time point t3, the first electronic device 201 may display a recommendation UI 1533 on the state UI 1521. For example, the recommendation UI 1533 may include the phrase (e.g., play phone music on the AI speaker) for recommending the content continuity playback using the second electronic device 211. For example, when the connected second electronic device 211 is an electronic device supporting content continuity playback associated with the first CP, the first electronic device 201 may display the recommendation UI 1533.

According to an embodiment, at the time point t3, the first electronic device 201 may receive a third input 1530 to the recommendation UI 1533. For example, the third input 1530 may include a touch input to the recommendation UI 1533.

According to an embodiment, at a time point t4, the second electronic device 211 may perform content continuity playback on the first multimedia. For example, as described with reference to FIG. 11, the first electronic device 201 may transmit a playback request to the IoT server 221 in response to the third input 1530 (e.g., operation 1105). For example, the second electronic device 211 may perform the content continuity playback by using the playback information of the first electronic device 201. The second electronic device 211 may continuously play the first multimedia, which is being played in the first electronic device 201. In this case, the first electronic device 201 may interrupt the playback of the first multimedia.

For example, at the time point t4, the first electronic device 201 may display information about the first multimedia, which is being currently played, in the external electronic device playback state UI 1531. For example, at the time point t4, the first electronic device 201 may display information (e.g., listening on the AI speaker living room) indicating that the current first multimedia is being played in the second electronic device 211, in a playback state UI 1525.

According to an embodiment, at the time point t4, the first electronic device 201 may display a playback switch UI 1541 in the state UI 1521. For example, the playback switch UI 1541 may include information (e.g., switch AI speaker music to phone) for recommending the content continuity playback in the first electronic device 201, with respect to multimedia (e.g., first multimedia), which is being currently played in the second electronic device 211.

Figure 16:
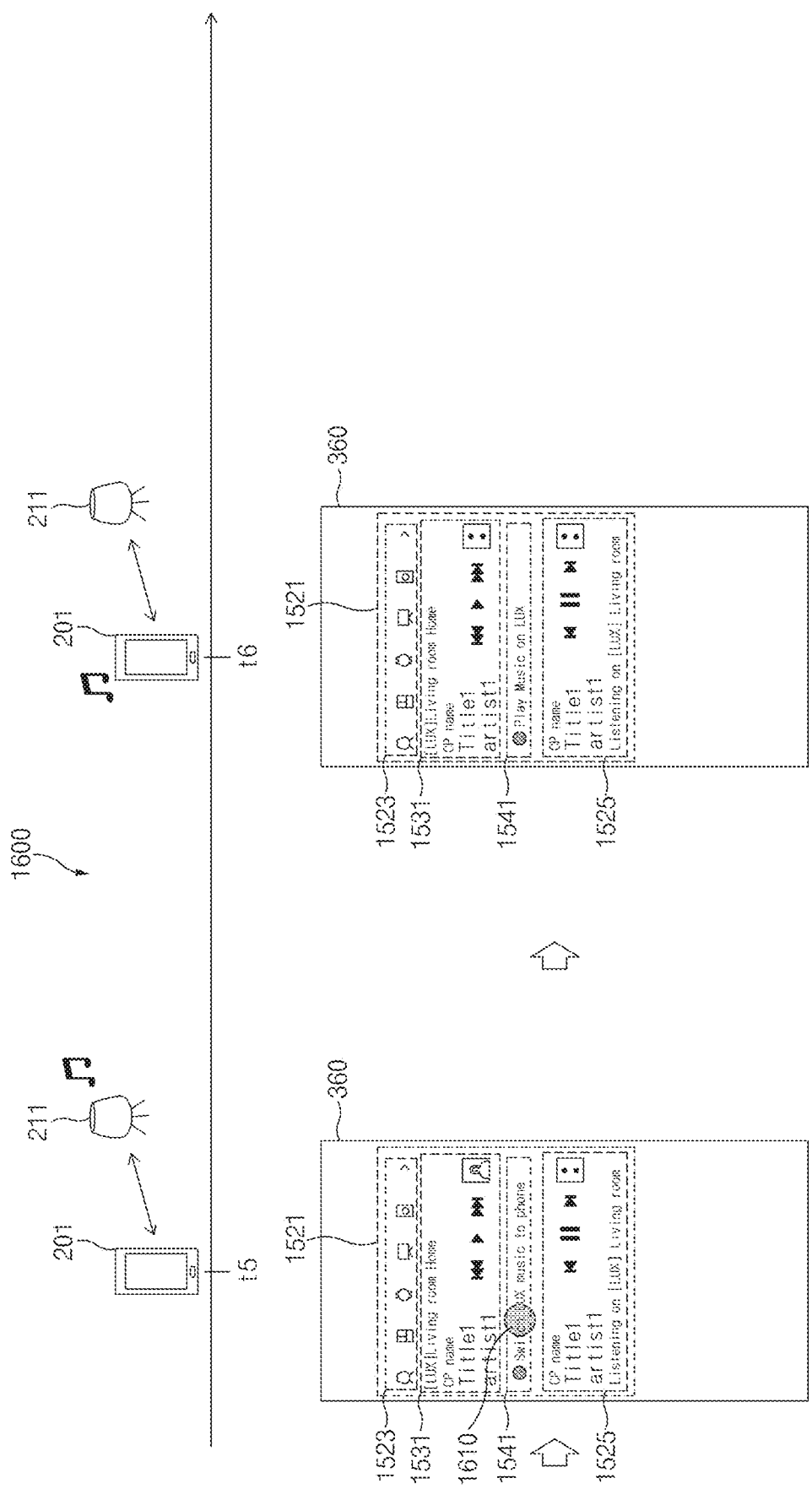
FIG. 16 illustrates a conceptual diagram of content continuity playback from a second electronic device to a first electronic device according to an embodiment of the disclosure.

FIG. 16 illustrates a conceptual diagram of content continuity playback from a second electronic device to a first electronic device according to an embodiment of the disclosure.

Referring to FIG. 16, a conceptual diagram 1600 for continuous content delivery is illustrated. The first electronic device 201 and the second electronic device 211 may be in the connected state. For example, the second electronic device 211 may be performing content continuity playback on multimedia (e.g., first multimedia), which was being played in the first electronic device 201. For example, a time point t5 may be a time point after the time point t4 of FIG. 15.

According to an embodiment, at the time point t5, the first electronic device 201 may receive a fourth input 1610 to the playback switch UI 1541. For example, the fourth input 1610 may be a touch input to the playback switch UI 1541.

According to an embodiment, at a time point t6, the first electronic device 201 may perform content continuity playback on the first multimedia in response to the fourth input 1610. For example, the first electronic device 201 may continuously play the music, which is being played in the second electronic device 211. In this case, the second electronic device 211 may interrupt the playback of the first multimedia.

According to an embodiment, at the time point t6, the first electronic device 201 may display the recommendation UI 1533. For example, as the content continuity playback of the second electronic device 211 is interrupted, the first electronic device 201 may display the recommendation UI 1533 for recommending the content continuity playback to the second electronic device 211, in the state UI 1521.

The UIs described with reference to FIGS. 15 and 16 are exemplary for description, and various embodiments of the disclosure are not limited thereto.

According to various embodiments, an electronic device (e.g., the first electronic device 201 of FIG. 2) may include a display (e.g., the display 360 of FIG. 3), at least one communication circuit (e.g., the communication circuit 390 of FIG. 3), a processor (e.g., the processor 320 of FIG. 3) operatively connected to the display and the at least one communication circuit, and a memory (e.g., the memory 330 of FIG. 3) operatively connected to the processor. The memory may store instructions that, when executed, cause the processor to perform the operations to be described.

According to various embodiments, the electronic device may receive user activity information including information of contents, which is being currently played or has been previously played in the electronic device, from a CP server (e.g., the CP server 241 of FIG. 2) of a contents provider (CP) through an Internet of things (IoT) server (e.g., the IoT server 221 of FIG. 2) when one or more external electronic devices (e.g., the second electronic device 211) are discovered, may obtain a list of an external electronic device associated with the electronic device supporting contents playback of the CP from the IoT server, based on the user activity information, and may display a first user interface (UI) (e.g., the first UI 500 of FIG. 5) for recommending playing the contents, which is being currently played or has been previously played in the electronic device, through at least one of the one or more external electronic devices on the display, based on the discovered one or more external electronic devices and the list of the external electronic device.

According to an embodiment, the electronic device may discover the one or more external electronic devices, by performing NFC, Wi-Fi communication, EM sensing, Bluetooth communication, BLE communication, sound recognition, ultrasound communication, user voice detection, or NAN using the at least one communication circuit.

According to an embodiment, the electronic device may obtain the list of the external electronic device supporting the contents playback of the CP, from the IoT server when the user activity information indicates that the contents is being currently played in the electronic device or indicates that the contents has been played within a specified time in the electronic device.

According to an embodiment, the electronic device may display the first UI on the display when there is at least one external electronic device included in both the list of the external electronic device and the discovered one or more external electronic devices.

According to an embodiment, the electronic device may display a second UI (e.g., the second UI 600 of FIG. 6) including a list of the at least one external electronic device included in both the discovered one or more external electronic devices and the list of the external electronic device, on the display when an input to the first UI corresponding to a playback request of the contents using at least one of the one or more external electronic devices is received.

According to an embodiment, the electronic device may play the contents, using an external electronic device corresponding to the user input when a user input to the list of the at least one external electronic device is received.

According to an embodiment, the electronic device may play the contents, using the external electronic device corresponding to the user input by transmitting the playback request to the IoT server.

For example, the playback request may include identification information of the external electronic device corresponding to the user input, a CP identifier of the contents, and access permission information about the CP of the electronic device.

According to various embodiments, an electronic device (e.g., the IoT server 221 of FIG. 2) may include at least one communication circuit, a processor operatively connected to the at least one communication circuit, and a memory operatively connected to the processor and storing CP metadata. The memory may store instructions that, when executed, cause the processor to perform the operations to be described.

For example, the electronic device may obtain user activity information associated with the first external electronic device from a CP server (e.g., the CP server 241 of FIG. 2) of a first CP associated with the user activity information request when a user activity information request is received from a first external electronic device (e.g., the first electronic device 201 of FIG. 2), may transmit the obtained user activity information to the first external electronic device, may transmit a list of a second electronic device supporting the first CP among second electronic devices associated with the first external electronic device, to the first external electronic device when receiving a device list request including a CP identifier of the first CP from the first external electronic device, and may control the third electronic device to play contents from the first CP when a playback request including identification information about the CP and a third electronic device (e.g., the second electronic device 211 of FIG. 2) among the second electronic devices from the first external electronic device is received.

According to various embodiments, the user activity information may include at least one of information indicating that the contents of the first CP is being currently played in the first external electronic device or information indicating a time when the contents of the first CP is played in the first external electronic device.

According to various embodiments, the electronic device may obtain access permission to the CP server associated with the first external electronic device, from an account server and may obtain the user activity information associated with the first external electronic device from the CP server, using the access permission, when the user activity information request is received from the first external electronic device.

According to various embodiments, the electronic device may transmit a command that allows the third electronic device to install the CP device application, when the playback request including the CP identifier and the identification information about the third electronic device among the second electronic devices is received from the first external electronic device, and when a CP device application is not installed in the third electronic device.

According to various embodiments, the electronic device may transmit information for access to the CP server to the third electronic device when the playback request including the CP identifier and the identification information about the third electronic device among the second electronic devices is received from the first external electronic device.

According to various embodiments, a contents playing method of an electronic device (e.g., the first electronic device 201 of FIG. 2) may include receiving user activity information including information of contents, which is being currently played or has been previously played in the electronic device, from a CP server (e.g., the CP server 241 of FIG. 2) of a CP through an IoT server (e.g., the IoT server 221 of FIG. 2) when one or more external electronic devices are discovered, obtaining a list of an external electronic device associated with the electronic device supporting contents playback of the CP from the IoT server, based on the user activity information, and displaying a first UI (e.g., the first UI 500 of FIG. 5) for recommending playing the contents, which is being currently played or has been previously played in the electronic device, on a display of the electronic device through at least one of the one or more external electronic devices, based on the discovered one or more external electronic devices and the list of the external electronic device.

According to an embodiment, the data communication method may further include discovering the one or more external electronic devices, by performing NFC, Wi-Fi communication, EM sensing, Bluetooth communication, BLE communication, sound recognition, ultrasound communication, user voice detection, or NAN.

According to an embodiment, the obtaining of the list of the external electronic device associated with the electronic device from the IoT server may include obtaining the list of the external electronic device supporting the contents playback of the CP, from the IoT server when the user activity information indicates that the contents is being currently played in the electronic device or indicates that the contents has been played within a specified time in the electronic device.

According to an embodiment, the displaying of the first UI on the display of the electronic device may include displaying the first UI on the display when there is at least one external electronic device included in both the discovered one or more external electronic devices and the list of the external electronic device.

According to an embodiment, the contents playing method may further include displaying a second UI including a list of at least one external electronic device included in both the discovered one or more external electronic devices and the list of the external electronic device, on the display when an input to the first UI corresponding to a playback request of the contents using at least one of the one or more external electronic devices is received.

According to an embodiment, the contents playing method may further include controlling the external electronic device to play the contents, using an external electronic device corresponding to the user input when a user input to the list of the at least one external electronic device is received.

According to an embodiment, the controlling of the external electronic device may include playing the contents, using the external electronic device corresponding to the user input by transmitting the playback request to the IoT server.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a seamless contents playing method may be provided.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   at least one communication circuit;
   a processor operatively connected to the display and the at least one communication circuit; and
   a memory operatively connected to the processor,
   wherein the memory stores instructions that, when executed, cause the processor to:
   when one or more first external electronic devices are discovered, receive user activity information from a contents provider (CP) server through an Internet of things (IoT) server, the user activity information including contents information of content which is currently played or was previously played in the electronic device,
   obtain a list including one or more second external electronic devices supporting contents playback for a CP associated with the CP server from the IoT server based on the user activity information, and
   display a first user interface (UI) on the display for recommending playing the content from one of the one or more first external electronic devices based on a comparison between the one or more first external electronic devices and the one or more second external electronic devices.

2. The electronic device of claim 1, wherein the instructions further cause the processor to:
   perform at least one of near field communication (NFC), Wi-Fi communication, electromagnetic (EM) sensing, Bluetooth communication, Bluetooth low energy (BLE) communication, sound recognition, ultrasound communication, user voice detection, or neighbor awareness network (NAN) using the at least one communication circuit to discover the one or more first external electronic devices.

3. The electronic device of claim 1, wherein the instructions further cause the processor to:
   determine whether the user activity information indicates that the content is currently being played in the electronic device or was previously played within a specified time in the electronic device, and
   when the user activity information indicates that the content is currently being played in the electronic device or was previously played within the specified time in the electronic device, obtain the list from the IoT server.

4. The electronic device of claim 1, wherein the instructions further cause the processor to:
   determine whether an external electronic device is included in both the one or more first external electronic devices and the list of the one or more second external electronic devices, and
   when the external electronic device is included in both the one or more first external electronic devices and the one or more second external electronic devices, display the first UI on the display.

5. The electronic device of claim 4, wherein the instructions further cause the processor to:
   determine whether an input to the first UI is received to request playback of the content using at least one of the one or more first external electronic devices,
   when the input is received, identify one or more third external electronic devices included in both the one or more first external electronic devices and the one or more second external electronic devices, and
   display a second UI on the display comprising a second list including the one or more third external electronic devices.

6. The electronic device of claim 5, wherein the instructions further cause the processor to:
   when a user input to the second list is received, play the content using an external electronic device from the one or more third external electronic devices corresponding to the user input.

7. The electronic device of claim 6, wherein the instructions further cause the processor to:
   transmit a playback request to the IoT server to play the content using the external electronic device.

8. The electronic device of claim 7, wherein the playback request comprises identification information of the external electronic device, a CP identifier of the content, and access permission information for the CP.

9. A method of playing content in an electronic device, the method comprising:
   when one or more first external electronic devices are discovered, receiving user activity information from a contents provider (CP) server through an Internet of things (IoT) server, the user activity information including contents information of content which is currently being played or was previously played in the electronic device;
   obtaining a list including one or more second external electronic devices supporting contents playback for a CP associated with the CP server from the IoT server based on the user activity information; and
   displaying a first user interface (UI) on a display for recommending playing the content from one of the one or more first external electronic devices based on a comparison between the one or more first external electronic devices and the one or more second external electronic devices.

10. The method of claim 9, further comprising:
    performing at least one of near field communication (NFC), Wi-Fi communication, electromagnetic (EM) sensing, Bluetooth communication, Bluetooth low energy (BLE) communication, sound recognition, ultrasound communication, user voice detection, or neighbor awareness network (NAN) to discover the one or more first external electronic devices.

11. The method of claim 9, wherein the obtaining of the list comprises:
    determining whether the user activity information indicates that the content is currently being played in the electronic device or was previously played within a specified time in the electronic device; and
    when the user activity information indicates that the content is currently being played in the electronic device or was previously played within the specified time in the electronic device, obtaining the list from the IoT server.

12. The method of claim 9, wherein the displaying of the first UI on the display of the electronic device comprises:
    determining whether an external electronic device is included in both the one or more first external electronic devices and the one or more second external electronic devices,
    when the external electronic device is included in both the one or more first external electronic devices and the one or more second external electronic devices, displaying the first UI on the display.

13. The method of claim 12, further comprising:
- determining whether an input to the first UI is received to a request playback of the content using at least one of the one or more first external electronic devices;
- when the input is received, identifying one or more third external electronic devices included in both the one or more first external electronic devices and the one or more second external electronic devices; and
- displaying a second UI on the display comprising a second list including the one or more third external electronic devices.

14. The method of claim 13, further comprising:
- when a user input to the second list is received, controlling the external electronic device from the one or more third external electronic devices corresponding to the user input to play the content.

15. The method of claim 14, wherein the controlling of the external electronic device comprises:
- transmitting a playback request to the IoT server to play the content using the external electronic device.

* * * * *